(12) United States Patent
Senokuchi

(10) Patent No.: US 12,061,641 B2
(45) Date of Patent: Aug. 13, 2024

(54) VIDEO DELIVERY DEVICE, VIDEO DELIVERY SYSTEM, VIDEO DELIVERY METHOD AND VIDEO DELIVERY PROGRAM

(71) Applicant: AMATELUS Inc., Tokyo (JP)

(72) Inventor: Izuru Senokuchi, Tokyo (JP)

(73) Assignee: Amatelus Inc., Tokyo (JP)

( * ) Notice: Subject to any disclaimer, the term of this patent is extended or adjusted under 35 U.S.C. 154(b) by 391 days.

(21) Appl. No.: 17/358,663

(22) Filed: Jun. 25, 2021

(65) Prior Publication Data

US 2022/0050869 A1 Feb. 17, 2022

Related U.S. Application Data

(63) Continuation of application No. PCT/JP2019/050407, filed on Dec. 23, 2019.

(30) Foreign Application Priority Data

Dec. 26, 2018 (JP) .................. 2018-243807

(51) Int. Cl.
*G06F 3/04842* (2022.01)
*G06F 3/0482* (2013.01)
(Continued)

(52) U.S. Cl.
CPC .......... *G06F 16/538* (2019.01); *G06F 3/0482* (2013.01); *G06F 3/04842* (2013.01);
(Continued)

(58) Field of Classification Search
CPC .. G06F 16/538; G06F 3/0482; G06F 3/04842; G06F 3/0488; G06F 16/51;
(Continued)

(56) References Cited

U.S. PATENT DOCUMENTS 9,462,301 B2 * 10/2016 Paśko ................ H04N 21/2393
10,417,744 B2 * 9/2019 Shimojo ................ H04N 23/90
(Continued)

FOREIGN PATENT DOCUMENTS

CN 103765875 A 4/2014
CN 103823877 A 5/2014
(Continued)

OTHER PUBLICATIONS

Extended European Search Report dated Oct. 10, 2022, of counterpart European Patent Application No. 19902494.4.
(Continued)

*Primary Examiner* — Aaron W Carter
(74) *Attorney, Agent, or Firm* — DLA Piper LLP (US)

(57) ABSTRACT

An image distribution apparatus includes a storage that associates and stores image data with a value, a specifying value reception unit that receives the value, and a selection unit that selects one image data based on the received value and transmits the selected image data to a display device. If the value reception unit does not receive the value, the selection unit selects the image data corresponding to the value that has already been specified. If the value is received by the value reception unit, the selection unit selects the image data corresponding to the received value, identifies the frame configuring the new image data corresponding to the same time as or the time immediately after the time data of one image data corresponding to the time when the value is received by the value reception unit as reference, and transmits the new image data after the identified frame.

5 Claims, 13 Drawing Sheets

(51) Int. Cl.
*G06F 3/0488* (2022.01)
*G06F 16/51* (2019.01)
*G06F 16/538* (2019.01)
*G06F 16/55* (2019.01)

(52) U.S. Cl.
CPC ............ *G06F 3/0488* (2013.01); *G06F 16/51* (2019.01); *G06F 16/55* (2019.01)

(58) Field of Classification Search
CPC ... G06F 16/55; G06F 3/0416; H04N 21/2387; H04N 21/41407; H04N 21/4728; H04N 21/6587; H04N 21/21805; H04N 21/2668
See application file for complete search history.

(56) References Cited

U.S. PATENT DOCUMENTS

| | | | |
|---|---|---|---|
| 11,113,787 B2* | 9/2021 | Shimojo | G06F 16/40 |
| 11,562,466 B2* | 1/2023 | Shimojo | G06F 3/04883 |
| 2011/0096713 A1 | 4/2011 | Rusert et al. | |
| 2011/0205171 A1* | 8/2011 | Akiyoshi | G11B 27/34 345/173 |
| 2012/0257025 A1* | 10/2012 | Kim | H04N 13/398 348/51 |
| 2014/0270706 A1 | 9/2014 | Pasko | |
| 2015/0010287 A1 | 1/2015 | Eriguchi | |
| 2016/0112698 A1* | 4/2016 | Kim | H04N 13/189 386/262 |
| 2017/0026667 A1* | 1/2017 | Pasko | G11B 27/28 |
| 2017/0178404 A1* | 6/2017 | Dillard | G06F 3/04886 |
| 2017/0208238 A1 | 7/2017 | Xu | |
| 2017/0272785 A1* | 9/2017 | Jeong | H04L 65/764 |
| 2018/0091704 A1 | 3/2018 | Koyama et al. | |
| 2018/0101285 A1* | 4/2018 | Lin | G06F 16/2379 |
| 2018/0189928 A1* | 7/2018 | Vaquero | H04N 21/4318 |
| 2018/0225840 A1 | 8/2018 | Ikeda et al. | |
| 2018/0343442 A1* | 11/2018 | Yoshikawa | H04N 21/438 |
| 2019/0087936 A1* | 3/2019 | Shimojo | G06F 3/04883 |
| 2020/0228754 A1* | 7/2020 | Shimojo | G06T 7/20 |
| 2021/0092463 A1* | 3/2021 | Gupta | A63F 13/5255 |
| 2021/0092464 A1* | 3/2021 | Gupta | G06V 20/42 |
| 2021/0383837 A1* | 12/2021 | Ren | G06F 9/542 |
| 2022/0050869 A1* | 2/2022 | Senokuchi | H04N 21/4728 |
| 2023/0269411 A1* | 8/2023 | Senokuchi | H04N 21/234 725/25 |
| 2023/0308762 A1* | 9/2023 | Ue | H04N 23/698 348/39 |
| 2023/0393731 A1* | 12/2023 | Dohno | G06F 3/0485 |

FOREIGN PATENT DOCUMENTS

| | | |
|---|---|---|
| CN | 105306799 A | 2/2016 |
| CN | 105681656 A | 6/2016 |
| EP | 3 413 570 A1 | 12/2018 |
| JP | 2010-130086 A | 6/2010 |
| JP | 2011-526447 A | 10/2011 |
| JP | 2015-005823 A | 1/2015 |
| JP | 2015-177394 A | 10/2015 |
| JP | 2016-517672 A | 6/2016 |
| WO | 2016/208102 A1 | 12/2016 |
| WO | 2017/038541 A1 | 3/2017 |

OTHER PUBLICATIONS

Aiming for "Democratization" of 3D-CG / VR-Interview with Amatelus Japan Co., Ltd https://www.sumoviva.jp/trend-tips, Jun. 30, 2017 with English translation Author: Hiroyasu Yasuda.
Office Action issued on May 21, 2019 in counterpart Japanese Application No. 2018-243807 with English translation.
Office Action issued on Jun. 25, 2019 in counterpart Japanese Application No. 2018-243807 with English translations.
Title: Demonstration experiment started in the world's first "SwipeVideo" web-based video project that allows users to experience 360-degree free-view video by swiping; https: //prtimes.JP/main/html/rd/p/000000002.000028108; Aug. 31, 2017; with English Translation.
First Office Action dated Feb. 25, 2023, of counterpart Chinese Patent Application No. 201980091265.8, along with an English translation.
Notice of Preliminary Rejection dated Jun. 3, 2024, of counterpart Korean Patent Application No. 10-2021-7022605, along with an English translation.

* cited by examiner

VIDEO DELIVERY DEVICE, VIDEO DELIVERY SYSTEM, VIDEO DELIVERY METHOD AND VIDEO DELIVERY PROGRAM

TECHNICAL FIELD

This disclosure relates to an image distribution apparatus, an image distribution system, an image distribution method, and an image distribution program.

BACKGROUND

Japanese Laid-Open Patent Publication No. 2015-177394 discloses a conventional technology. In JP 2015-177394 A, a plurality of cameras A to D image the same subject from different angles and, then, when the first camera A and the last camera D are specified, the video images imaged by the cameras A to D are switched and synthesized in the adjacent order of camera A, camera B, camera C, and camera D to perform a synthesizing and editing process on a multi-view imaged image.

The conventional technology is configured to edit a plurality of video data acquired based on imaging a subject by a plurality of cameras to appropriately synthesize the video data. Accordingly, when a video imaged by one of the plurality of cameras is displayed on a display, the conventional technology fails to switch the video to another video imaged by the other one of the cameras at any given time point and display it on the display.

It could therefore be helpful to provide an image distribution apparatus, an image distribution system, an image distribution method, and an image distribution program for easily switching a plurality of video data and displaying one video data.

SUMMARY

We thus provide:

An image distribution apparatus comprises: a storage for associating and storing, for each of a plurality of video data, image data generated by grouping frames configuring the video data in chronological order with a specifying value for specifying the image data; a specifying value reception unit for receiving a specifying value for specifying image data that a user wishes to view; and a selection unit for selecting one image data from a plurality of image data stored in the storage based on the specifying value received by the specifying value reception unit, and transmitting the selected image data to an external display device. In this configuration, if the specifying value is not received by the specifying value reception unit, the selection unit may select the image data corresponding to the specifying value that has already been specified, and transmit the selected image data to the display device. In addition, if the specifying value is received by the specifying value reception unit, the selection unit may select the image data corresponding to the received specifying value, and at the same time, identify a frame configuring a new image data corresponding to the same time as or a time immediately after a time data of one image data corresponding to a time when the specifying value is received by the specifying value reception unit as reference, and transmit the new image data after the identified frame to the display device.

The image distribution apparatus may preferably further include an acquisition unit for acquiring a plurality of video data; and a data generator for generating image data based on the video data and storing the image data in the storage.

The data generator may preferably generate image data by generating a plurality of still image groups by grouping a plurality of frames in chronological order.

The data generating unit may preferably generate image data by generating a plurality of still image clusters by grouping a plurality of frames in chronological order, and further generating a plurality of still image groups by grouping the plurality of generated still image clusters in chronological order.

The data generator may preferably generate a plurality of still image clusters by grouping a plurality of frames in chronological order, extract one or more frames from among the frames configuring the still image clusters, and generate a plurality of still image groups by grouping the generated still image clusters and the one or more frames to generate the image data.

When the selection unit transmits the selected image data to the display device, the selection unit may preferably transmit, as the selected image data, the first image data and the second image data generated from one video data. In this configuration, the first image data may preferably be directed to image data obtained by generating a plurality of still image groups by grouping a plurality of frames together in chronological order by the data generator. Further, the second image data may preferably be directed to image data obtained by generating a plurality of still image clusters by grouping together a plurality of frames in chronological order, and further generating a plurality of still image groups by grouping together the plurality of generated still image clusters in chronological order by the data generator.

The storage may preferably associate and store the frame configuring the image data with the time at which the frame is imaged. When the selection unit transmits one image data, when a new specifying value is received by the specifying value reception unit, the selection unit may preferably identify a frame of the new image data corresponding to the same time as or a time immediately after a time when a frame configuring the one image data corresponding to a time when the new specifying value is received as reference is imaged.

The storage may preferably associate and store the image data with the position data indicating the imaging position at which the subject is imaged to generate each of the plurality of video data as the specifying value on one-to-one basis.

The acquisition unit may preferably acquire a plurality of video data in which a subject is imaged from different directions. In this configuration, the position data may preferably correspond to direction data that indicates information allowing a direction in which the subject is imaged to be identified. In addition, the specifying value reception unit may preferably receive, as the specifying value, a direction specifying value for specifying a direction data corresponding to an image data that the user wishes to view.

An image distribution system includes: the image distribution apparatus as described above and a plurality of mobile terminals arranged to surround the subject and connected to the image distribution apparatus via a communication network. In this configuration, the plurality of mobile terminals may preferably configure a plurality of imaging units that respectively generate video data by imaging the subject from different directions, and transmit the video data to the image distribution apparatus via the communication network. In addition, the acquisition unit may preferably acquire a plurality of video data transmitted by each of the plurality of mobile terminals.

The image distribution system may preferably further include an information processing terminal configuring the display device. The information processing terminal includes: a touch panel that receives and displays the image data transmitted from the image distribution apparatus; and an operation recognition unit that recognizes a movement of a finger of the user as an operation to the touch panel as a direction specifying operation to select a direction specifying value, and recognizes an amount of the movement of the finger of the user as a direction specifying value. In this configuration, the information processing terminal may preferably display on the touch panel an image data that is transmitted from the selection unit and corresponds to the direction specifying value that changes based on the direction specifying operation when the direction specifying operation is performed, and at the same time, if the direction specifying operation is not performed, the information processing terminal may preferably sequentially receive the image data of the direction specifying value based on the immediately preceding direction specifying operation in chronological order of time data, and display a pseudo movie on the touch panel.

The operation recognition unit may preferably recognize a swiping operation to the touch panel as the direction specifying operation.

When the specifying value reception unit receives the direction specifying value, if an amount of change in the direction specifying value per unit time is less than a predetermined threshold value, the selection unit may preferably select an image data such that the direction data is continuously connected. In addition, if the amount of change in the direction specifying value per unit time is greater than or equal to the predetermined threshold value, the selection unit may preferably select an image data such that the direction data is intermittently connected.

The information processing terminal may preferably further includes: a request unit that requests image data to be displayed on the touch panel based on the direction specifying value to the selection unit; and a drawing unit that uses hyper text markup language (HTML) data to draw the image data acquired by the request unit on the touch panel. In this configuration, the time TF during which the drawing unit draws the image data on the touch panel may preferably be longer than the time TD during which the request unit acquires the image data from the selection unit and transfers it to the drawing unit.

An image distribution method causes a computer to execute the steps of: associating and storing in a storage, for each of a plurality of video data, image data generated by grouping frames configuring the video data in chronological order with a specifying value for specifying the image data; receiving a specifying value for specifying image data that a user wishes to view; and selecting one image data from a plurality of image data stored in the storage based on the specifying value received by the specifying value receiving step, and transmitting the selected image data to an external display device. In this configuration, if the specifying value is not received in the specifying value receiving step, the selecting step may include a step of selecting an image data corresponding to the specifying value that has already been specified. In addition, if the specifying value is received in the specifying value receiving step, the selecting step may include the steps of: selecting the image data corresponding to the received specifying value, and at the same time, identifying a frame configuring a new image data corresponding to the same time as or a time immediately after a time data of one image data corresponding to a time when the specifying value is received in the specifying value receiving step as reference, and transmitting the new image data after the identified frame to the display device.

An image distribution program causes a computer to embody the functions of: associating and storing in a storage, for each of a plurality of video data, image data generated by grouping frames configuring the video data in chronological order with a specifying value for specifying the image data; receiving a specifying value for specifying image data that a user wishes to view; and selecting one image data from a plurality of image data stored in the storage based on the specifying value received by the specifying value receiving function, and transmitting the selected image data to an external display device. In this configuration, if the specifying value is not received by the specifying value receiving function, the selecting function may select an image data corresponding to the specifying value that has already been specified. In addition, if the specifying value is received by the specifying value receiving function, the selecting function may select the image data corresponding to the received specifying value, and at the same time, identify a frame configuring a new image data corresponding to the same time as or a time immediately after a time data of one image data corresponding to a time when the specifying value is received by the specifying value receiving function as reference, and transmit the new image data after the identified frame to the display device.

This disclosure provides an image distribution apparatus, an image distribution system, an image distribution method, and an image distribution program for easily switching a plurality of video data and displaying one video data.

DETAILED DESCRIPTION

Figure 1:
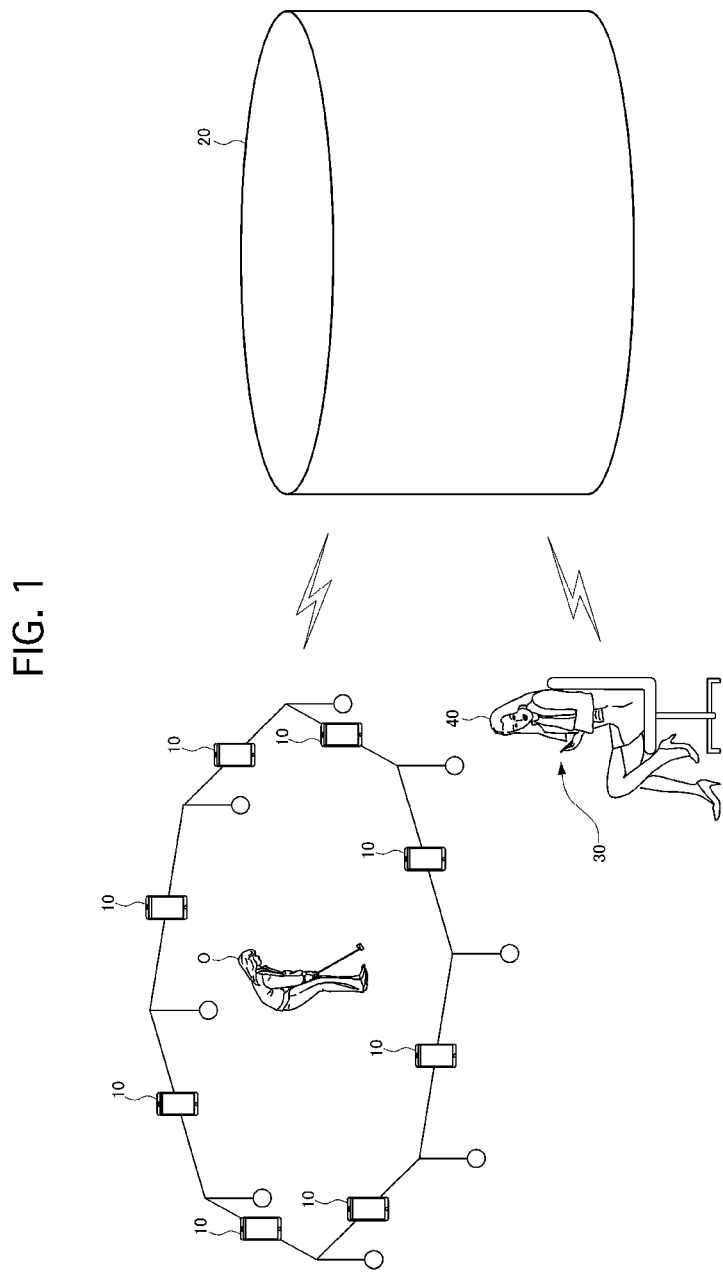
FIG. 1 is a diagram illustrating an example of a configuration of an image distribution system.

An example will be described with reference to the drawings. FIG. 1 is a diagram illustrating an example of a configuration of an image distribution system.

An image distribution system 1 includes a plurality of mobile terminals 10 (imaging units) arranged to surround a subject O, an image distribution apparatus 20 that distributes image data imaged by mobile terminals 10, and an information processing terminal 30 (display) having a display monitor 36 (touch panel) that displays images from the image distribution apparatus 20.

The plurality of mobile terminals 10, image distribution apparatus 20, and information processing terminal 30 are connected to each other via a communication network. As a communication network, any of a variety of communication methods including wireless LAN (e.g., Wi-Fi, 3G, LTE, Bluetooth (registered trademark)) may be used. The communication network may be a wired network.

The plurality of mobile terminals 10 each have a camera that images the subject O from different directions. The plurality of mobile terminals 10 may have a function for recording the video acquired by imaging. Each mobile terminal 10 transmits the imaged video to the communication network. The camera has an image sensor such as CCD or CMOS. Although the following description illustrates an example in which MPEG data is used as the video data and JPEG data is used as image data, the formats of video data and image data may be changed as desired.

Also, in this configuration, "Bullet Time imaging" is performed in which the plurality of mobile terminals 10 surround the subject O. The Bullet Time imaging is to arrange a plurality of cameras around the subject O and continuously image the subject O by each camera in turn in the direction in which a user wishes to move the angle. In the Bullet Time imaging, image processing may be used to slow down the movement of the subject O or to image the images in which the camera work moves at a high speed. The image distribution apparatus 20 may include an image processing unit (not shown) for speed change playback. The image processing unit may, for example, slow down and speed up the playback. Not the image distribution apparatus 20 but the information processing terminal 30 may include the image processing unit.

Next, a configuration of the image distribution apparatus 20 will be described. The configuration of the image distribution apparatus 20 described below is illustrative only, and various modifications may be made to the extent that the necessary functions described below can be secured. The image distribution apparatus 20 is directed to an apparatus for providing the services of the image distribution system 1 to the information processing terminal 30. The image distribution apparatus 20 may include, for example, a server device or computer (e.g., desktop, laptop, and/or tablet).

Figure 2:
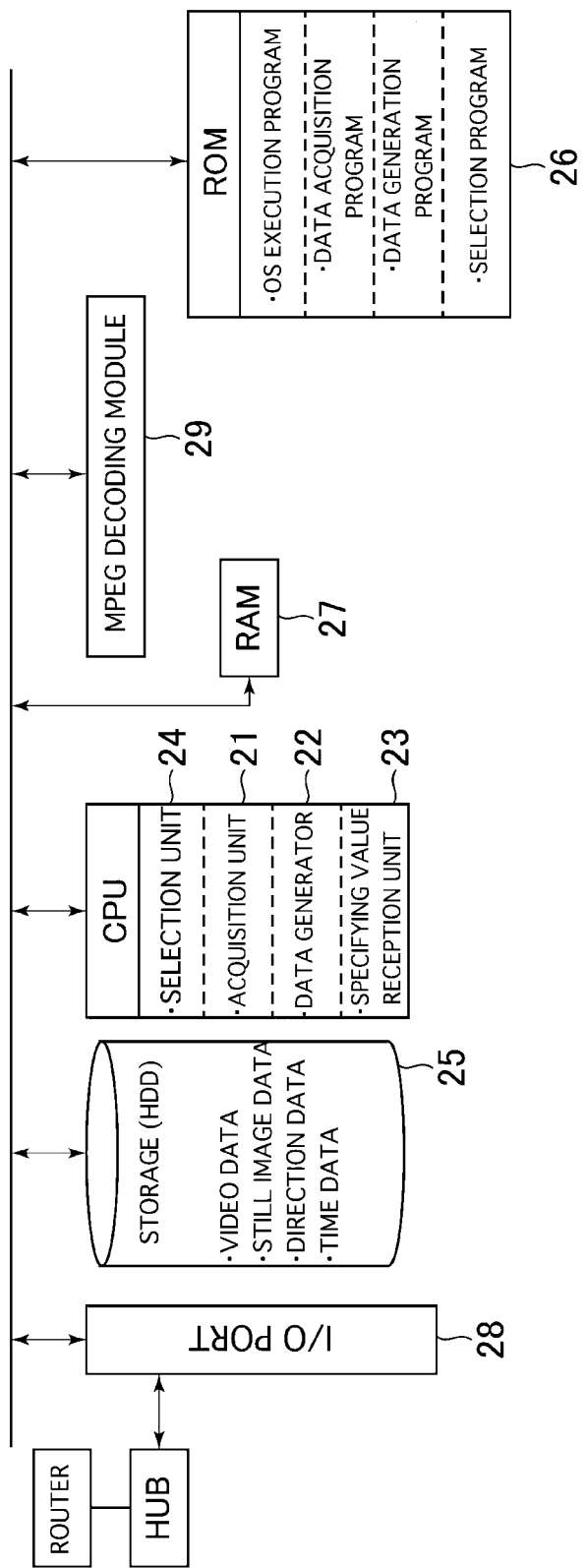
FIG. 2 is a block diagram illustrating a configuration of an image distribution apparatus.

FIG. 2 is a block diagram illustrating the configuration of the image distribution apparatus. FIGS. 3(A)-3(D) are diagrams illustrating an example of the image data. As shown in FIG. 2, the image distribution apparatus 20 includes an acquisition unit 21, a data generator 22, a specifying value reception unit 23, a selection unit 24, a storage 25, a ROM 26, a RAM 27, an I/O port 28, a router, a HUB, and an MPEG decoding module 29.

The acquisition unit 21, the data generator 22, the specifying value reception unit 23, and the selection unit 24 are processors having a function to control each portion of the image distribution apparatus 20, and in the example shown in FIG. 2, they correspond to a central processing unit. The acquisition unit 21, the data generator 22, the specifying value reception unit 23, and the selection unit 24 may be a microprocessor, a processor core, a multiprocessor, an application-specific integrated circuit (ASIC), and a field programmable gate array (FPGA), for example.

The acquisition unit 21 acquires a plurality of video data imaged at different points via the I/O port 28. In this configuration, the acquisition unit 21 acquires a plurality of video data in which the subject O is imaged from different directions. That is, the acquisition unit 21 acquires a plurality of videos obtained by the plurality of mobile terminals 10 each imaging the subject O from each of the mobile terminals 10 via the communication network. The video data acquired by the acquisition unit 21 is stored in the storage 25. The acquisition unit 21 executes a data acquisition program stored in the ROM 26 when acquiring the video data.

The data generator 22 generates image data based on the video data and stores the image data in the storage 25. For each of the plurality of video data, the data generator 22 generates image data by grouping the frames configuring the video data in chronological order.

Figure 3:
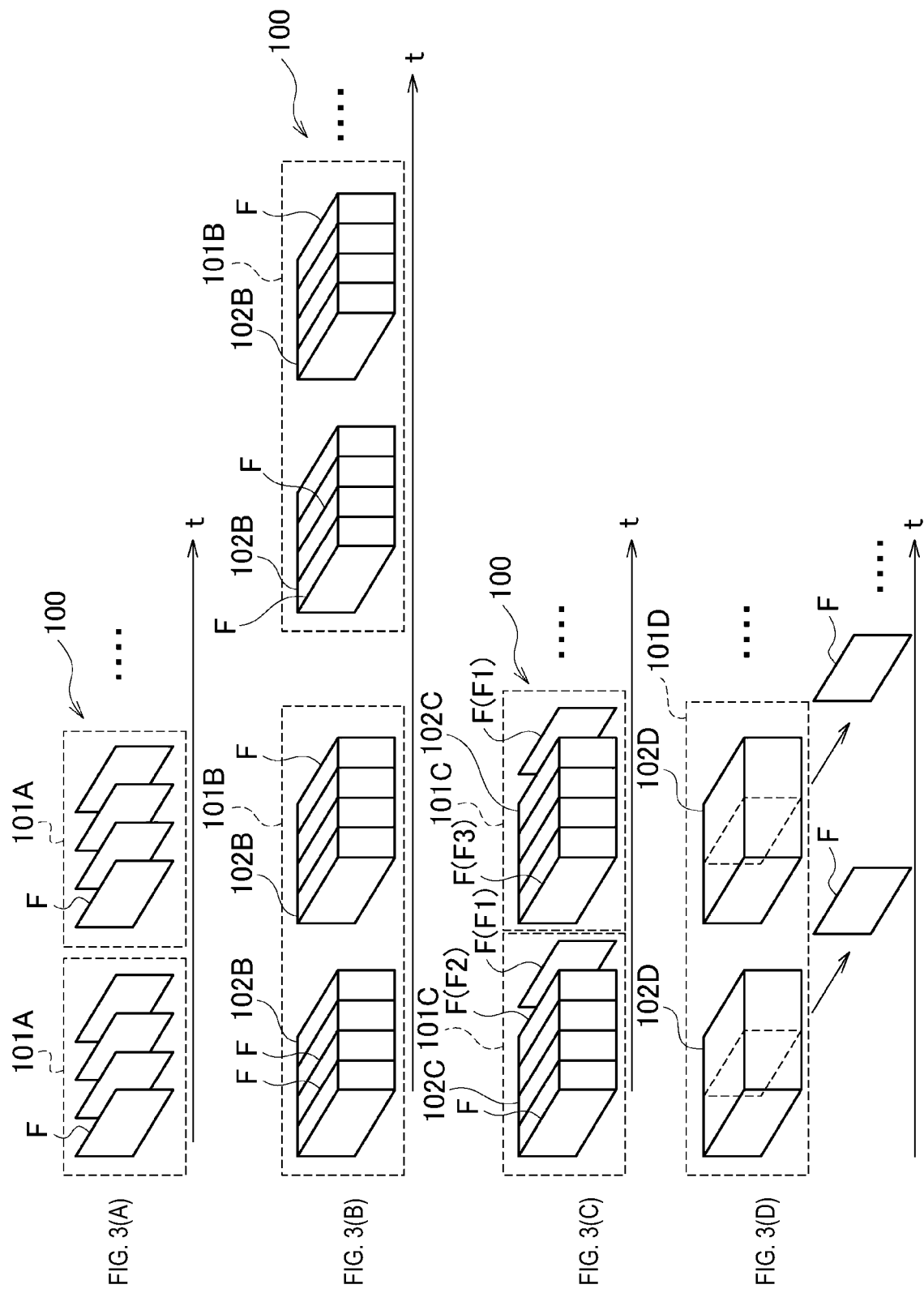
FIGS. 3(A)-3(D) are diagrams illustrating an example of image data.

The data generator 22 preferably generates the image data 100 by, for example, generating a plurality of still image groups by grouping a plurality of frames in chronological order. That is, as illustrated in FIG. 3(A), the data generator 22 generates a plurality of still image groups 101A in chronological order. Each still image group 101A is generated by grouping together a plurality of frames F arranged in chronological order. As illustrated in FIG. 3(A), each still image group 101A includes four frames F. However, the still image cluster 101A is not limited to this example. That is, the still image group 101A may include two or more frames F. It is preferable that the number of frames F configuring each of the plurality of still image groups 101A be the same.

Alternatively, the data generator 22 may preferably generate the image data 100 by, for example, generating a plurality of still image clusters by grouping a plurality of frames in chronological order, and further generating a plurality of still image groups by grouping the generated plurality of still image clusters in chronological order. That is, as illustrated in FIG. 3(B), the data generator 22 generates a plurality of still image clusters 101B in chronological order. Each still image group 101B is generated by grouping together a plurality of still image clusters 102B arranged in chronological order. Each still image cluster 102B is generated by grouping together a plurality of frames F arranged in chronological order. As illustrated in FIG. 3(B), the still image group 101B includes two of the still image clusters 102B. However, the still image group 101B is not limited to this example That is, the still image group 101B may include two or more still image clusters 102B. As illustrated in FIG. 3(B), each still image cluster 102B includes four frames F. However, the still image cluster 102B is not limited to this example. That is, the still image cluster 102B may include two or more frames F. It is preferable that the number of the still image clusters 102B configuring each still image group 101B be the same. It is preferable that the number of frames configuring each still image cluster 102B be the same.

Alternatively, the data generator 22 may generate the still image cluster 102B by dividing the frames into a plurality of frames that configure the video data. In this configuration, the still image cluster 102B corresponds to divided video data. As one specific example, the data generator 22 may divide the video data every 100 milliseconds to generate still image clusters (divided video data). If the video is imaged at 30 fps, the still image cluster (divided video data) includes approximately three frames. The video is compressed in the time direction, thereby reducing the amount of the divided video data compared to the amount of data configured by three independent frames.

Alternatively, it is preferable that the data generator 22 may, for example, generate a plurality of still image clusters by grouping a plurality of frames in chronological order, extract one or more frames from among the frames configuring the still image clusters, and generate a plurality of still image groups by grouping the still image clusters and the one or more frames to generate the image data 100. That is, as illustrated in FIG. 3(C), the data generator 22 generates a plurality of still image groups 101C in chronological order. The still image group 101C is generated by synthesizing one or more still image clusters 102C and one or more frames F (F1). If the still image group 101C includes a plurality of still image clusters 102C, the plurality of still image clusters 102C may be generated chronologically successive. In addition, the one or more frames F (F1) configuring the still image group 101C are distributed at the beginning (first portion) or the end (last portion) of the still image group 101C in a time series. As illustrated in FIG. 3(C), the still image group 101C includes one still image cluster 102C and one frame F1 in the chronologically last portion. The one or more frames F (F1) are extracted from the immediately preceding still image cluster 102C or the immediately following still image cluster 102C. As a more specific example, when the still image group 101C includes one frame F1, the one frame F1 is generated by extracting the chronologically last frame F2 of the plurality of frames F configuring the immediately preceding still image cluster 102C. Alternatively, the one frame F1 may be generated by extracting the chronologically first frame F3 of the plurality of frames F configuring the immediately following still image cluster 102C. The data generator 22 may generate the still image cluster 102C by dividing the frames into a plurality of frames configuring the video data. In this configuration, the still image cluster 102C corresponds to the divided video data.

Alternatively, when the data generator 22 generates a still image group 101D (still image clusters 102D) the same as the still image group 101B (still image clusters 102B) illustrated in FIG. 3(B), when the specifying value is received by the specifying value reception unit 23 described below, the data generator 22 may extract one or more frames F from the still image group 101D (still image clusters 102D) (see FIG. 3(D)). Although FIG. 3(D) shows an example of extracting one frame F, the extraction is not limited to this example. That is, the data generator 22 may extract one or more frames F from the still image group 101D (still image clusters 102D). The data generator 22 may generate the still image cluster 102D by dividing the frames into a plurality of frames that configure the video data. In this configuration, the still image cluster 102C corresponds to the divided video data.

The data generator 22 executes a data generation program stored in the ROM 26 when generating image data. The data generation program uses the MPEG decoding module 29 to decompress the video data stored in the storage 25 to configure the data into a set of image data, and then store it again in the storage 25. In this configuration, each image data is stored in association with the time data indicating the time point at which each image data is imaged. In generating the image data, a portion of the generated image data may be stored in the RAM 27 as needed.

That is, the data generator 22 associates and stores in the storage 25 the image data with the specifying value for specifying the image data. In this configuration, the data generator 22 associates the image data with the position data indicating the imaging position at which the subject is imaged to generate each of the plurality of video data as a specifying value on one-to-one basis, and stores them in the storage 25. In addition, the data generator 22 associates the frame configuring the image data with the time at which the frame is imaged, and stores them in the storage 25.

The specifying value reception unit 23 receives a specifying value for specifying the image data that the user wishes to view. In this configuration, the specifying value reception unit 23 receives, as a specifying value, a direction specifying value for specifying direction data that specifies the direction in which the subject O is imaged in the image data that the user 40 wishes to view.

Figure 4:
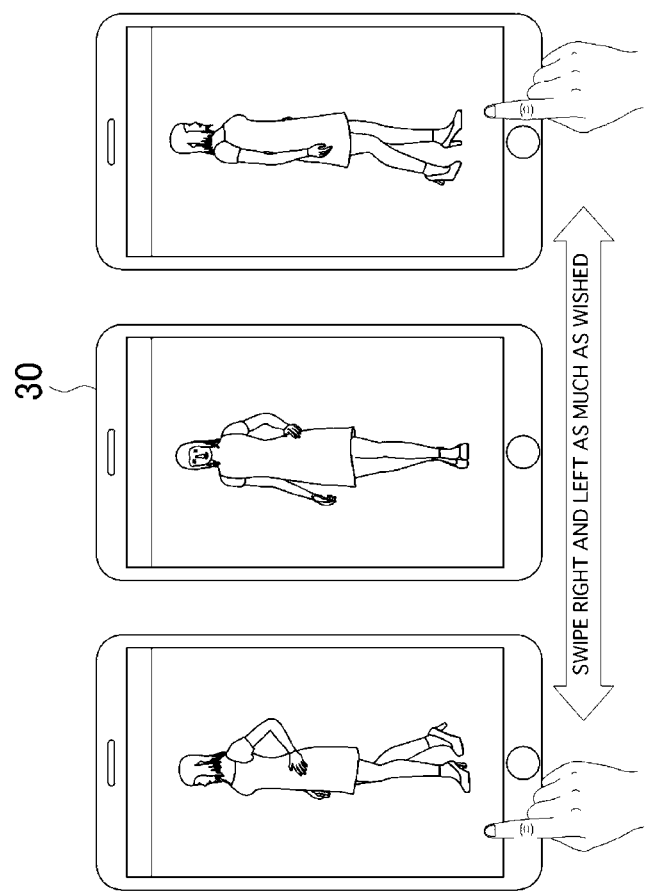
FIG. 4 is a diagram illustrating a simulated video that allows a user to view.
Figure 5:
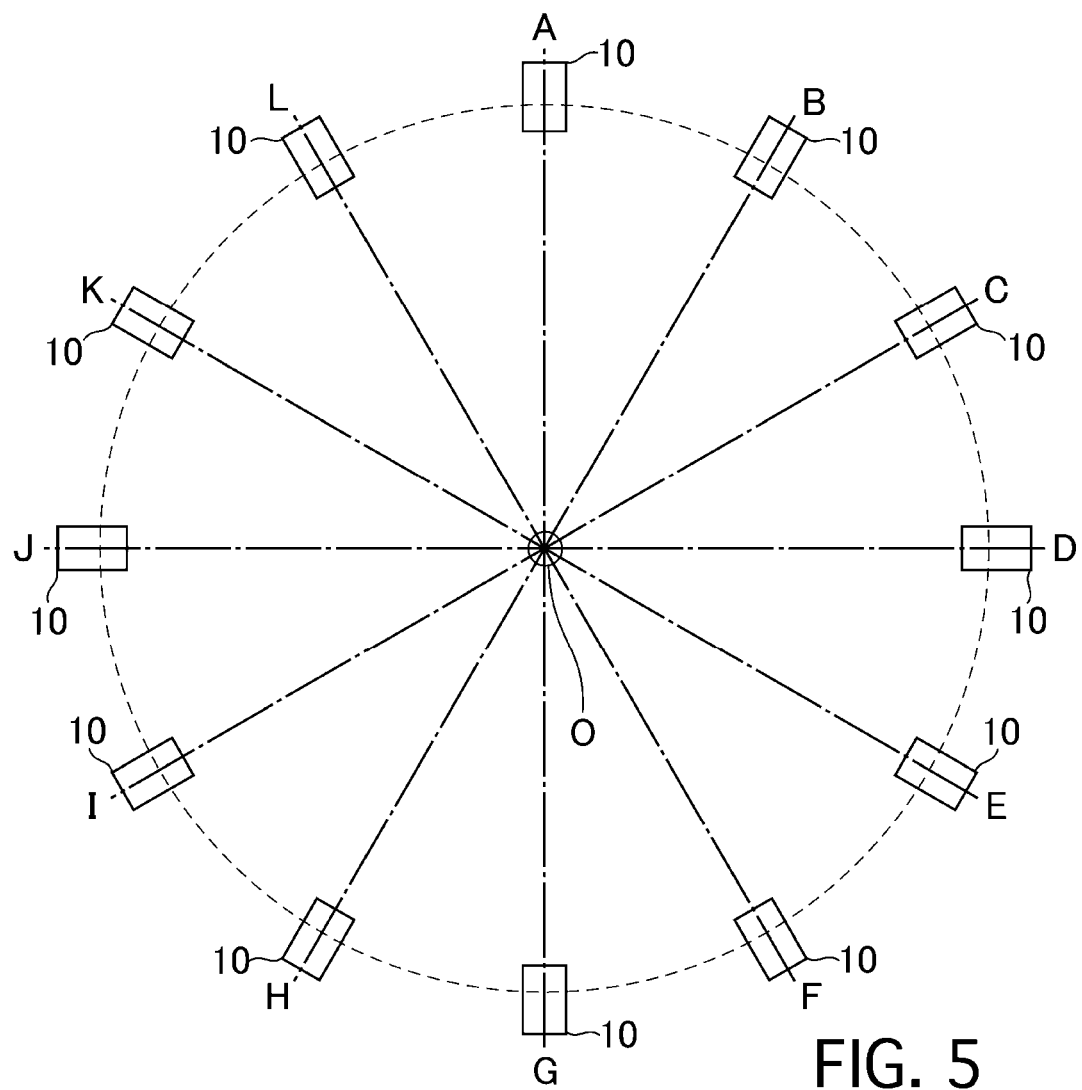
FIG. 5 is a diagram illustrating an example of an arrangement of a plurality of mobile terminals.

FIG. 4 is a diagram illustrating a simulated video that allows a user to view. FIG. 5 is a diagram illustrating an example of an arrangement of a plurality of mobile terminals.

Specifically, the information processing terminal 30 described below receives an instruction to indicate whether the user wishes to view the right side or the left side of the subject O, as illustrated in FIG. 4, by a screen operation such as sliding a finger while touching the display monitor 36 (touch panel), i.e., swiping operation. The specifying value reception unit 23 receives a specification of a direction such as from which direction of A to L (see FIG. 5) among the portable terminals 10 to view the subject O, on the basis of the instructions received by the information processing terminal 30.

For example, a swiping operation for sliding a finger from the left side of the screen to the right side of the screen while touching the screen may change the direction in which the subject is viewed so that the right side of the subject is displayed. In contrast, a swiping operation for sliding a finger from the right side of the screen to the left side of the screen while touching the screen may change the direction in which the subject is viewed so that the left side of the subject is displayed. That is, in this configuration, the position of the user viewing the subject changes with respect to the subject in the direction of the finger movement.

In addition, for example, a swiping operation for sliding a finger from the left side of the screen to the right side of the screen while touching the screen may change the direction in which the subject is viewed so that the left side of the subject is displayed. In contrast, a swiping operation for sliding a finger from the right side of the screen to the left side of the screen while touching the screen may change the direction in which the subject is viewed such that the right side of the subject is displayed. That is, in this configuration, the subject is rotated with respect to the user in the direction of the finger movement.

The viewing direction may be changed by touching the screen without a swiping operation. For example, the viewing direction may be changed by touching a portion of the screen that is located to the right or to the left from the center in the horizontal direction. The rotation angle of the screen may be reduced when the distance from the center to the portion to be touched in the horizontal direction is close, and the rotation of the screen may be reduced when the distance from the center to the portion to be touched in the horizontal direction is close.

The selection unit 24 shown in FIG. 2 selects one image data from among a plurality of image data stored in the storage 25 on the basis of the specifying value received by the specifying value reception unit 23, and transmits the selected image data to the external information processing terminal 30. In this configuration, if the specifying value reception unit 23 does not receive the specifying value, the selection unit 24 selects the image data corresponding to the already specified specifying value. In addition, if the specifying value is received by the specifying value reception unit 23, the selection unit 24 selects the image data corresponding to the received specifying value, and at the same time, identifies the frame configuring the new image data corresponding to the same time as or the time immediately after the time data of one image data corresponding to the time when the specifying value is received by the specifying value reception unit 23 as reference, and transmits the new image data after the identified frame to the information processing terminal 30.

That is, the selection unit 24 transmits one still image group configuring the image data on the basis of the specifying value. If any further specifying value is not received, the selection unit 24 transmits subsequent still image groups in chronological order for the one transmitted still image group. If a new specifying value is received, the selection unit 24 selects new image data corresponding to the new specifying value, and transmits a still image group including frames corresponding to the same time as or the time immediately after the time when the new specifying value is received as reference, from among the new image data.

When the information processing terminal 30 receives the image data, it generates Hyper Text Markup Language (HTML) data as an example. The HTML data is directed to the data of web pages for providing images, which may be delivered in HTML format that may be used with a web browser.

In addition, when the selection unit 24 transmits the selected image data to the information processing terminal 30, the selection unit 24 may transmit, as the selected image data, the first image data and the second image data generated from one video data. In this configuration, the first image data is directed to image data obtained by generating a plurality of still image groups by grouping a plurality of frames together in chronological order by the data generator 22. Further, the second image data is directed to image data obtained by generating a plurality of still image clusters by grouping together a plurality of frames in chronological order, and further generating a plurality of still image groups by grouping together the plurality of generated still image clusters in chronological order by the data generator 22.

In addition, when the selection unit 24 transmits one image data, when a new specifying value is received by the specifying value reception unit 23, the selection unit 24 may identify a frame of the new image data corresponding to the same time as or the time immediately after the time when the frame configuring the one image data corresponding to the time when the new specifying value is received as reference is imaged.

As described above, the storage 25 associates and stores the image data with a specifying value for specifying the image data. In this configuration, for each of the plurality of video data, the data generator 22 generates image data by grouping the frames configuring the video data in chronological order. In addition, the storage 25 associates and stores the frame configuring the image data with the time at which the frame is imaged. The storage 25 associates and stores the image data with the position data indicating the imaging position at which the subject is imaged to generate each of the plurality of video data as the specifying value on one-to-one basis. The time data may be stored in the form of time information or a time stamp that describes the relative time point at which each still image is imaged. In this configuration, the position data is directed to direction data indicating the imaging direction in which the subject O is imaged.

The storage 25 may also have a function of storing various programs and data needed for the operation of the image distribution apparatus 20. The storage 25 may be, for example, various recording media such as hard disk drive (HDD), solid state drive (SSD), and flash memory.

The above described image distribution apparatus may be a function of a program operating in a computer. The program may be recorded on a recording medium such as an optical disk or memory.

Figure 6:
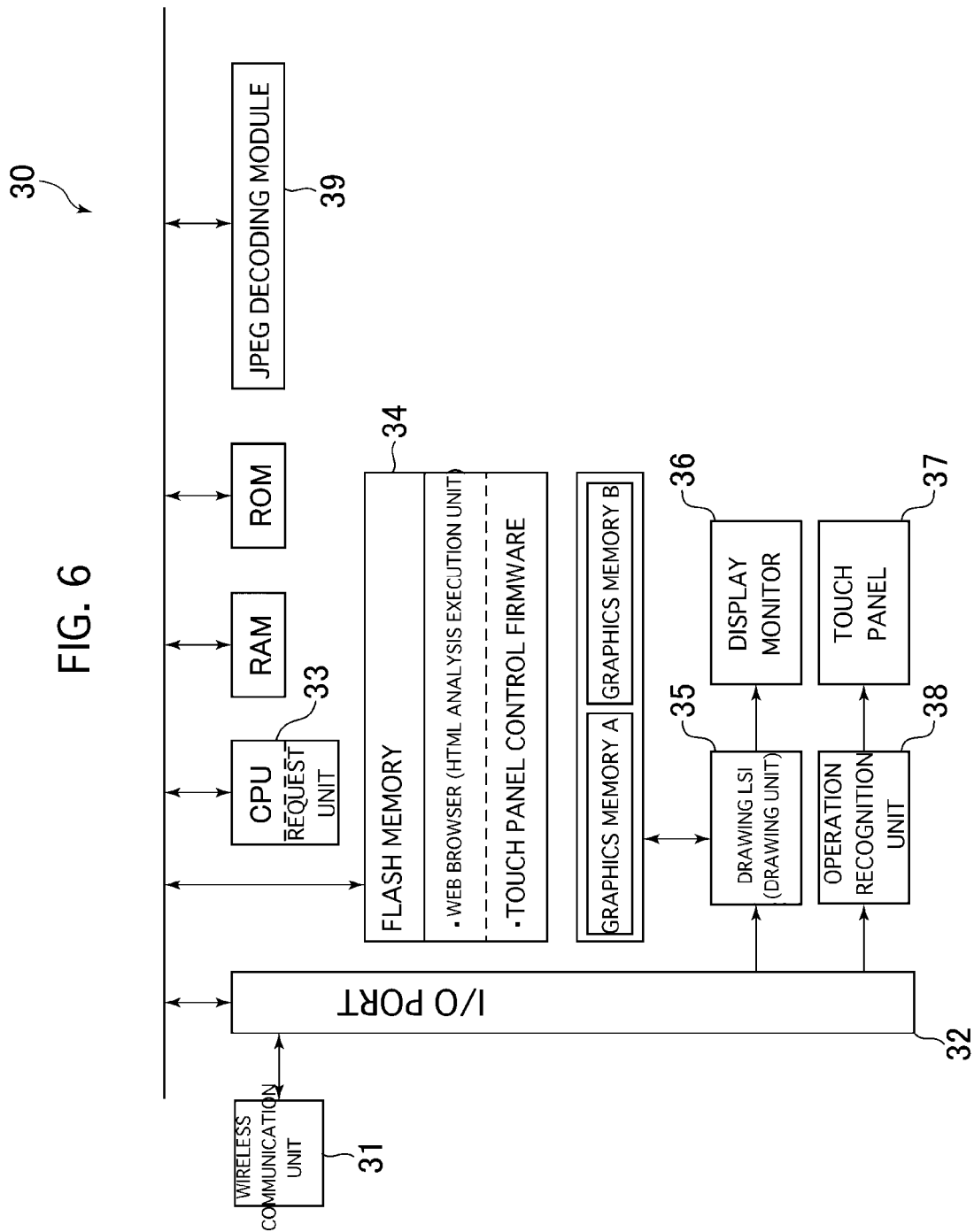
FIG. 6 is a block diagram illustrating a configuration of an information processing terminal.

Next, a configuration of the information processing terminal 30 will be described. FIG. 6 is a block diagram illustrating a configuration of an information processing terminal. The configuration of the information processing terminal 30 described below is illustrative only, and various modifications may be made to the extent that the necessary functions described below can be secured. The information processing terminal 30 may be, for example, a terminal device such as a smart phone or a tablet owned by the user 40 (see FIG. 1), and receive and display the image data transmitted from the selection unit 24.

As shown in FIG. 6, the information processing terminal 30 may include a wireless communication unit 31, an input/output (I/O) port 32, a CPU 33, a RAM, a ROM, a flash memory 34, a graphics memory, a drawing LSI 35, a display monitor 36, a touch panel 37, an operation recognition unit 38, and a JPEG decoding module 39, for example.

The wireless communication unit 31 transmits and receives data to and from the image distribution apparatus 20 via the I/O port 32. The information processing terminal 30 may have a wired communication unit in place of the wireless communication unit 31.

The flash memory 34 includes a web browser that generates, analyzes, and executes HTML data from the image data transmitted from the image distribution apparatus 20, and touch panel control firmware.

The CPU 33 serves as a request unit that requests the image data to be displayed on the display monitor 36 to the image distribution apparatus 20 on the basis of the direction specifying value.

In addition, the CPU 33 provides the user 40 with a pseudo-movie by changing the contents of the sequential still images in chronological order to the web page (HTML data) accessed from the web browser. The web page, as shown in FIG. 4, allows the user 40 to view the subject O from the direction he or she wishes to view it on the display monitor of the information processing terminal 30.

The request unit executes the control program stored in the flash memory when requesting a still image to the image distribution apparatus 20. JavaScript (trademark) may be employed as the language used for the control program.

Use of a function in JavaScript (trademark) to set the frequency at which the image data is selected allows the image data to be requested with high accuracy. The language used for the control program may be a language other than JavaScript (trademark).

The request unit requests image data from the image distribution apparatus 20 by executing a requesting program stored in a request memory of the ROM, for example. In this configuration, the requesting program identifies the image data corresponding to the direction in which the user 40 wishes to view using the direction specifying value recognized by the operation recognition unit 38 described below and stored in the RAM, and transmits a requesting signal for requesting the identified image data to the image distribution apparatus 20. The request unit decodes the image data received from the image distribution apparatus 20 in the image distribution apparatus 20 using the JPEG decoding module 39, and transfers it to the drawing LSI 35.

The drawing LSI 35 serves as a drawing unit that displays the image data acquired by the request unit via the I/O port 32 on the display monitor 36 using the HTML data. The drawing LSI 35 displays the image data by drawing the image data in the graphics memory. In this configuration, the information processing terminal 30 includes two graphic memories A and B. The size of the image data described herein may be preferably 15 to 120 KB, and more preferably 20 to 40 KB.

The touch panel 37 may be disposed, for example, at the rear of the display monitor 36. For example, the touch panel 37 may be a capacitive projection type and detect multiple points of contacts of the fingers of the user 40. The touch panel 37 may calculate the speed and acceleration of the finger using the change in position coordinates due to the movement of the fingers of the user 40 and the time the finger moves, and detect the amount of displacement of the finger as the amount of change in the direction specifying values. This allows the operation recognition unit 38 to recognize the operations from the user 40. The touch panel 37 and the display monitor 36 together may be referred to as the "touch panel." The "touch panel" refers to the configuration that integrates the touch panel 37 and the display monitor 36 of the configuration.

The operation recognition unit 38 recognizes a finger movement of the user 40 in front of the display monitor 36 as a direction specifying operation to recognize it as a direction specifying value, and stores it in the RAM. In this configuration, the operation recognition unit 38 recognizes a swiping operation in which the user 40 slides a finger while touching the surface of the display monitor 36 by the finger as a direction specifying operation.

In addition, in this configuration, if the specifying value reception unit 23 does not receive the direction specifying value, the selection unit 24 of the image distribution apparatus 20 selects the image data (still image data) corresponding to the already specified direction specifying value and transmits the selected image data (still image data) to the information processing terminal 30. Further, if the direction specifying value is received, the selection unit 24 selects the image data (still image data) corresponding to the received direction specifying value, and at the same time, identifies the frame configuring the new image data (still image data) corresponding to the same time as or the time immediately after the time data of one image data corresponding to the time when the direction specifying value is received by the specifying value reception unit 23 as reference, and transmits the new image data (still image data) after the identified frame to the information processing terminal 30.

Next, a mobile terminal 10 will be described. FIG. 5 illustrates an example in which a plurality of mobile terminals 10 are circumferentially arranged in a plane at the same height relative to the subject O. This arrangement example is only illustrative, and the quantity and arrangement interval of the mobile terminals 10 may be optionally changed. Each of the plurality of mobile terminals 10 is assigned an identification number (A to L) that identifies a corresponding one of them. Grasping the identification number allows the user to identify the direction in which the subject O is to be imaged. Accordingly, in this configuration, this identification number is treated as the direction data that the information processing terminal 30 specifies to the image distribution apparatus 20. The direction data may be information expressed in terms of a coordinate information indicating a position where the mobile terminal 10 is located, an angle from a predetermined reference line passing through the subject O in a top view as well as an identification number of the mobile terminal 10 if the direction in which the subject O is imaged can be specified.

Figure 7:
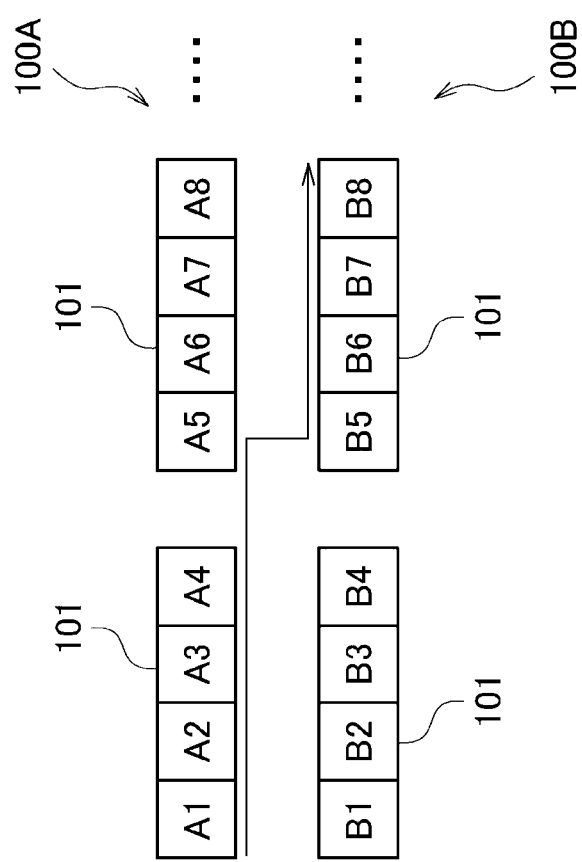
FIG. 7 is a diagram showing a first example for illustrating an order of image data to be selected by a selection unit.
Figure 8:
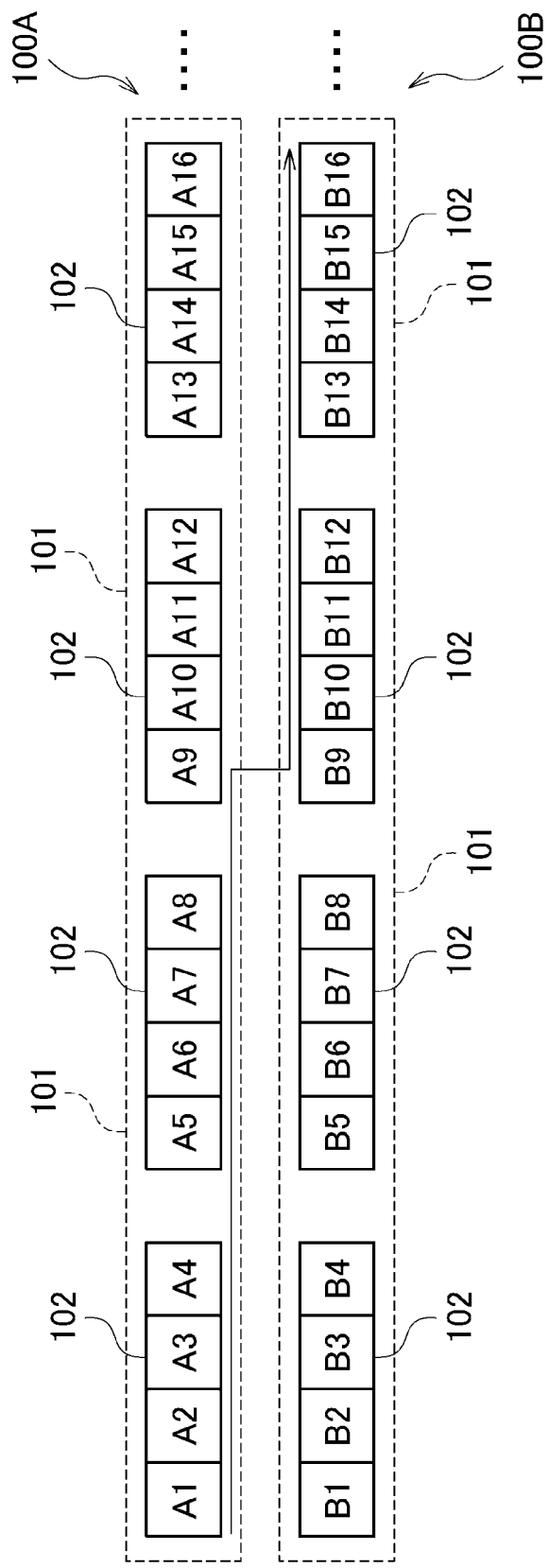
FIG. 8 is a diagram showing a second example for illustrating an order of the image data to be selected by the selection unit.
Figure 9:
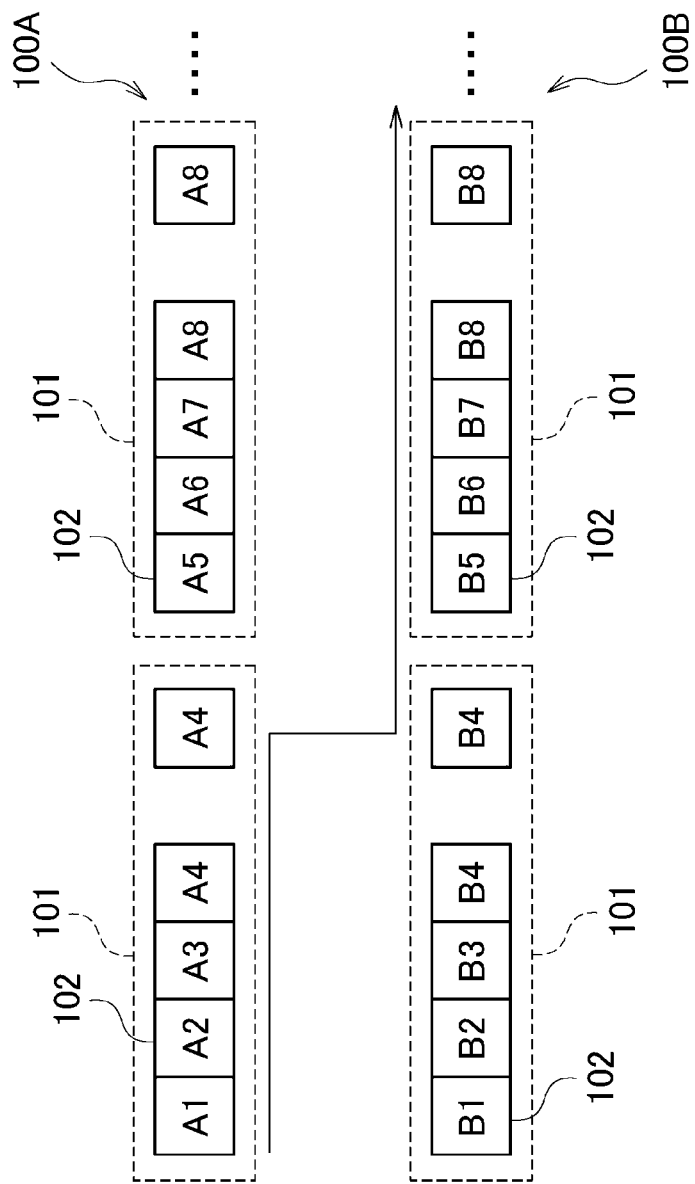
FIG. 9 is a diagram showing a third example for illustrating an order of the image data to be selected by the selection unit.
Figure 10:
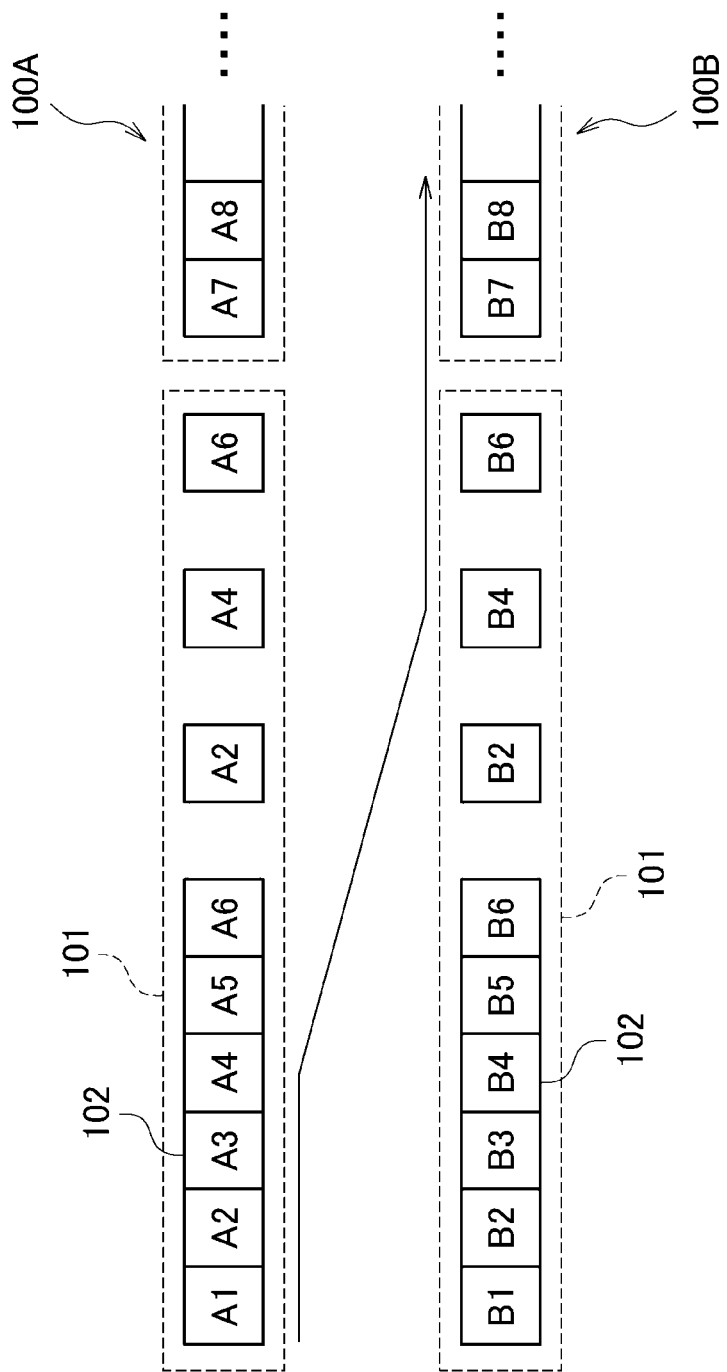
FIG. 10 is a diagram showing a fourth example for illustrating an order of the image data to be selected by the selection unit.
Figure 11:
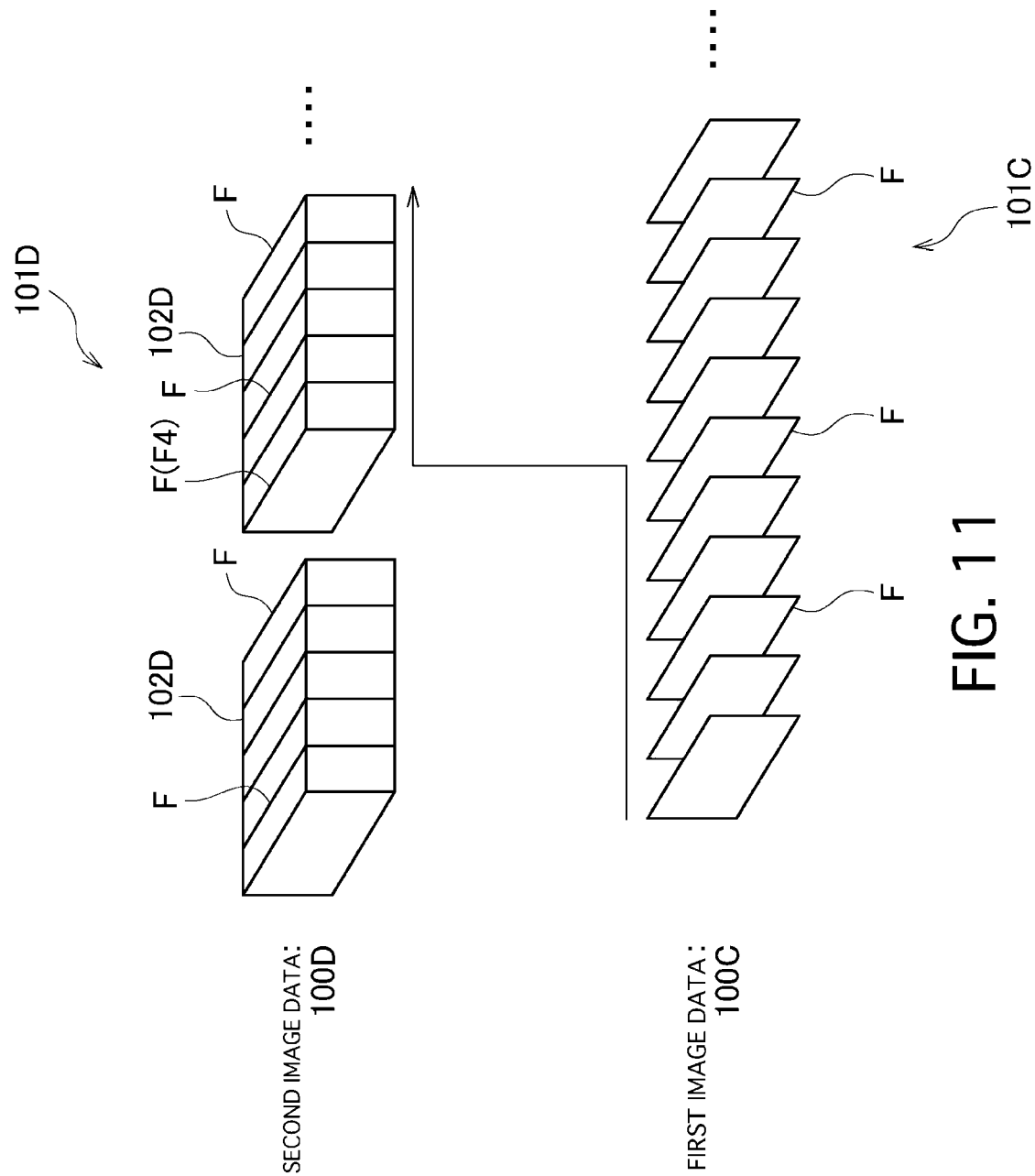
FIG. 11 is a diagram for illustrating the image data.

Next, the order of the image data to be selected by the selection unit 24 will be described. FIG. 7 is a diagram showing a first example that illustrates the order of the image data to be selected by the selection unit. FIG. 8 is a diagram showing a second example illustrating the order of the image data to be selected by the selection unit. FIG. 9 is a diagram showing a third example illustrating the order of the image data to be selected by the selection unit. FIG. 10 is a diagram showing a fourth example illustrating the order of the image data to be selected by the selection unit. FIG. 11 is a diagram illustrating the image data.

As described above, when the direction specifying value is received, the selection unit 24 selects image data corresponding to the received direction specifying value and transmits it to the information processing terminal 30. When a direction specifying value for specifying the portable terminal 10A is input at the information processing terminal 30, the selection unit 24, as illustrated in FIG. 7, selects image data 100A (still image group 101 including frames A1 to A4) based on the video data imaged by the portable terminal 10A and transmits it to the information processing terminal 30. As illustrated in FIG. 7, the still image group is configured by four frames. Accordingly, the selection unit 24 selects one still image group 101 configured by four frames and transmits a plurality of frames (one still image group 101) in chronological order to the information processing terminal 30 by an indication of one direction specifying value.

In addition, when the direction specifying value is not received, the selection unit 24 selects the image data 100A corresponding to the direction specifying value that has already been specified and transmits it to the information processing terminal 30. Accordingly, when the direction specifying value specifying the portable terminal 10A is received as described above and the selection unit 24 transmits the image data 100A (still image group including frames A1 to A4) to the information processing terminal 30, if a new direction specifying value is not received, the selection unit 24 transmits the chronologically successive image data 100A (still image group including frames A5 to A8) to the information processing terminal 30. The information processing terminal 30 sequentially displays images based on the chronologically successive image data 100A (still image group 101 including frames A1 to A4 and still image group 101 including frames A5 to A8) on the display monitor 36.

In contrast, if the direction specifying value is received, the selection unit 24 selects the image data corresponding to the received direction specifying value, and at the same time, identifies the frame configuring the new image data corresponding to the time immediately after the time data of one image data corresponding to the time when the direction specifying value is received by the specifying value reception unit 23 as reference, and transmits the new image data after the identified frame to the information processing terminal 30.

For example, when the selection unit 24 transmits the image data 100A (still image group 101 including frames A1 to A4) corresponding to the portable terminal 10A to the information processing terminal 30, and a direction specifying value specifying the portable terminal 10B is received, the selection unit 24 transmits the image data 100A (still image group 101 including frames A1 to A4) corresponding to the portable terminal 10A) to the information processing terminal 30, and then transmits the image data 100B (still image group 101 including frames B5 to B8) corresponding to the portable terminal 10B to the information processing terminal 30. In this configuration, the selection unit 24 identifies the image data 100B (frame B5) corresponding to the mobile terminal 10B at the time immediately after the time data associated with the image data 100A (still image group 101) corresponding to the mobile terminal 10A as reference (e.g., the time when the frame configuring the image data 100A is imaged by the mobile terminal 10) and transmits the image data 100B (still image group 101) including the frame B5 to the information processing terminal 30. That is, even when the image data is switched on the basis of the direction specifying value such as switching from the image data 100A corresponding to the mobile terminal 10A to the image data 100B corresponding to the mobile terminal 10B, the selection unit 24 selects the still image group in chronological order such that the still image group 101 including frames A1 to A4 is switched to the still image group 101 including frames B5 to B8. In frames A1 to A8 and frames B1 to B8, frames with the same number are assumed to have been imaged at the same or almost the same time.

As illustrated in FIG. 8, even when one still image group includes a plurality of still image clusters, the selection unit 24 selects the image data in the same manner as described above. That is, when the selection unit 24 transmits one still image group 101 (including still image cluster 102 including frames A1 to A4 and still image cluster 102 including frames A5 to A8) corresponding to the mobile terminal 10A, when a direction specifying value specifying the mobile terminal 10B is received, the selection unit 24 transmits one still image group 101 corresponding to the mobile terminal 10A, and then transmits the still image group 101 (including the still image cluster 102 including the frames B9 to B12 and the still image cluster 102 including the frames B13 to B16) corresponding to the mobile terminal 10B. In this configuration, the selection unit 24 identifies the still image group 101 (frame B9) corresponding to the mobile terminal 10B at the time immediately after the time data associated with the image data 100A (still image group 101) corresponding to the mobile terminal 10A as reference and transmits the still image group 101 including the frame B9 to the information processing terminal 30.

Alternatively, unlike the example of FIG. 8 above, the selection unit 24 may transmit the image data (still image group) as follows. That is, when the selection unit 24 transmits the still image cluster 102 including the frames A1 to A4 configuring the still image group 101, when the direction specifying value specifying the mobile terminal 10B is received, the selection unit 24 may transmit the still image group 101 configured by the still image cluster 102 including the frames B1 to B4 and the still image cluster 102 including the frames B5 to B8. In this configuration, the information processing terminal 30 receives from the image distribution apparatus 20 a still image group 101 (including a still image cluster 102 including frames A1 to A4 and a still image cluster 102 including frames A5 to A8) corresponding to the mobile terminal 10A and a still image group 101 (including a still image cluster 102 including frames B1 to B4 and a still image cluster 102 including frames B5 to B8) corresponding to the mobile terminal 10B. After displaying an image based on the still image cluster 102 including frames A1 to A4 on the display monitor 36, the information processing terminal 30 displays an image based on the still image cluster 102 including frame B5 at the time immediately after the time data assigned to the still image cluster 102 including frames A1 to A4 as reference on the display monitor 36. As described above, the information processing terminal 30 displays the image data (still image cluster) on the display monitor 36 in a chronologically successive manner even when the image data is switched on the basis of the direction specifying value.

In addition, as illustrated in FIG. 9, even when one still image group includes a still image cluster and one frame, the selection unit 24 selects the image data in the same manner as described above. That is, in the configuration where the selection unit 24 transmits one still image group 101 (including a still image cluster 102 including frames A1 to A4, and a frame A4) corresponding to the mobile terminal 10A, when a direction specifying value specifying the mobile terminal 10B is received, the selection unit 24 transmits still image groups 101 (i.e., the still image group 101 including the still image cluster 102 including the frames B1 to B4 and the frame B4, and the still image group 101 including the still image cluster 102 including the frames B5 to B8 and the frame B8) corresponding to the mobile terminal 10B. In this configuration, the information processing terminal 30 displays the frame A4 of the still image group 101 corresponding to the mobile terminal 10A on the display monitor 36, then displays the frame B4 of the still image group 101 corresponding to the mobile terminal 10B on the display monitor 36, and then displays the frames B5 to B8 on the display monitor 36. The information processing terminal 30 switches the still image group 101 to the still image group 101 (image data) including the frame B4 of the same time with respect to the time data of the frame A4 as reference, allowing the image data to be chronologically successively displayed on the display monitor 36. In addition, the image data is switched at the portion configured by one frame, allowing the switching process to be easier for the information processing terminal 30 than in the configuration where the image data is switched by the frames configuring the still image cluster 102. Further, different from the above, the information processing terminal 30 may switch the frame from any frame of the still image cluster 102 corresponding to the mobile terminal 10A to the frame B4 of the still image cluster 102 corresponding to the mobile terminal 10B. As a specific example, the information processing terminal 30 may switch the frame A3 to the frame B4 configured by a single frame.

In addition, as illustrated in FIG. 10, even when one still image group includes a still image cluster and a plurality of frames, the selection unit 24 selects the image data in the same manner as illustrated in FIG. 9. That is, when the selection unit 24 transmits one still image group 101 (including a still image cluster 102 including frames A1 to A6, and frames A2, A4 and A6) corresponding to the mobile terminal 10A (especially, in transmitting the frame A3), when a direction specifying value specifying the mobile terminal 10B is received, the selection unit 24 transmits a still image group 101 (including the still image cluster 102 including the frames B1 to B6 and the frames B2, B4 and B6) corresponding to the mobile terminal 10B. It is assumed that the direction specifying value is received when the selection unit 24 transmits the frame A3 of the still image cluster 102. At this time, the selection unit 24 identifies the frame B4 to which the same time as or the time immediately after the time data assigned to the frame A3 as reference is assigned, and transmits the still image group 101 including the frame B4. Since the frame B4 is independent as a single frame, the selection unit 24 identifies the frame B4. The selection unit 24 identifies, as a frame corresponding to the immediately preceding time or the immediately following time, a single frame that is independent of one still image group 101, or the chronologically first frame configuring the still image group 101 or the still image cluster 102. In this configuration, the information processing terminal 30 displays the frame A4 of the still image group 101 corresponding to the mobile terminal 10A on the display monitor 36, then displays the frame B4 (one independent frame) of the still image group 101 corresponding to the mobile terminal 10B on the display monitor 36, and then displays the chronologically successive frame B6 on the display monitor 36. Further, the information processing terminal 30 displays an image based on the still image group 101 starting from the frame B7 on the display monitor 36. The information processing terminal 30 switches the still image group 101 to the still image group 101 (image data 100B) including one frame B4 of the same time with respect to the time data of the frame A4 as reference, allowing the image data to be chronologically successively displayed on the display monitor 36. In addition, the image data is switched at the portion configured by one frame, allowing the switching process to be easier for the information processing terminal 30 than when the image data is switched by the frames configuring the still image cluster 102.

In the above configurations shown in FIGS. 7 to 10, examples in which the selection unit 24 selects the image data (still image data) corresponding to the adjacent mobile terminals 10 are described. The selection of the image data may, for example, switch the selection from the image data of the mobile terminal 10A shown in FIG. 4 to the image data of the mobile terminal 10E shown in FIG. 4. In this configuration, the selection unit 24 may, for example, sequentially select the image data corresponding to the portable terminal 10A, the image data corresponding to the portable terminal 10B, the image data corresponding to the portable terminal 10C, the image data corresponding to the portable terminal 10D, and the image data corresponding to the portable terminal 10E, and transmit them to the information processing terminal 30. That is, the selection unit 24 selects the image data so that the direction data is continuously connected when the amount of change in the direction specifying value per unit time is less than a threshold value.

Alternatively, the selection unit 24 may select the image data intermittently, for example, the image data corresponding to the portable terminal 10A, the image data corresponding to the portable terminal 10C, and the image data corresponding to the portable terminal 10E, and transmit the image data to the information processing terminal 30. That is, the selection unit 24 selects the image data such that the direction data is intermittently connected when the amount of change in the direction specifying value per unit time is greater than or equal to a threshold value. "Intermittently" is directed to a fact that only a part of the data is acquired for the direction data that are successively lined up. That is, when the operation recognition unit 38 determines that the amount of operation by the swiping operation is large due to the user 40 moving his or her finger large or fast, the image data corresponding to the direction data that is far away from the original direction data may be acquired without acquiring the image data corresponding to the adjacent direction data. This allows, for example, the user 40 to instantly confirm the image data acquired from the mobile terminal 10 with the diametrically opposed imaging direction.

When the selection unit 24 transmits the image data to the information processing terminal 30, the first image data and the second image data may be transmitted. The first image data is directed to image data obtained by generating a plurality of still image groups by grouping a plurality of frames together in chronological order. The second image data is directed to image data obtained by generating a plurality of still image clusters by grouping together a plurality of frames in chronological order, and further generating a plurality of still image groups by grouping together the plurality of generated still image clusters in chronological order. In this configuration, the data generator 22 generates the first image data and the second image data. When the direction specifying value is received, the selection unit 24 transmits the first image data and the second image data corresponding to the direction specifying value.

As illustrated in FIG. 11, when the information processing terminal 30 receives both the first image data 100C and the second image data 100D, it first displays the image on the display monitor 36 based on the first image data 100C. Since the second image data 100D has a plurality of frames F clustered together as a still image cluster 102D, it takes more time to receive the second image data 100D at the information processing terminal 30 than the first image data 100C in which one frame F is sequentially transmitted. That is, in an initial stage in which the information processing terminal 30 receives the image data, an image based on the first image data 100C, which takes less time to receive than the second image data 100D, is displayed on the display monitor 36. However, since the second image data 100D is clustered together as a still image cluster 102D (still image group 101D), after an initial stage in which the information processing terminal 30 receives the image data, the amount of the second image data 100D, in which a plurality of frames F together can be received, being temporarily stored is greater than that of the first image data 100C. That is, in the information processing terminal 30, after the initial stage, the drawing process is easier when the image is displayed on the display monitor 36 based on the second image data 100D than in the configuration based on the first image data 100C. When the information processing terminal 30 switches the first image data 100C to the second image data 100D, the drawing process is facilitated if the information processing terminal 30 switches the frame to the chronologically first frame F4 of the still image cluster 102D configuring the second image data 100D. Some configurations are not limited to the example of switching the frame to the first frame F4. That is, they may switch the frame to a chronologically later frame than the frame F4.

In addition, in the second image data 100D described above, the still image cluster 102D may be divided video data. As an example, even for a video that contains frames for five seconds, use of both the second image data 100D including the divided video data (still image clusters 102D) and the first image data 100C (reception of both in parallel) allows the information processing terminal 30 to embody smooth display and smooth switching of the portable terminal 10 (image data).

That is, if the division unit of the second image data 100D is about 5 seconds as an example, it takes time to load the second image data 100D. However, loading the first image data 100C in parallel with the second image data 100D allows the display based on the first image data 100C until the loading and display of the second image data 100D catch up. When the loading and display of the second image data 100D catch up, the first image data 100C is seamlessly switched to the second image data 100D, and the loading of the first image data 100C is stopped. In addition, the first image data 100C described above may be not only a still image but also a divided video data. In this configuration, the divided video data of the first image data 100C may be divided video data of any number of seconds such as 100 milliseconds as an example. This may result when, depending on the communication speed, transmitting divided video data of short period may be superior to transmitting still images.

As a variation, the selection unit 24 can also perform the following process. That is, in the same manner as described above, when the selection unit 24 transmits the image data to the information processing terminal 30, the first image data and the second image data may be transmitted. In this configuration, first, the selection unit 24 transmits the second image data 100D corresponding to the direction specifying value. After this, when the display monitor 36 is swiped by the user as shown in FIG. 4, the first image data 100C corresponding to the direction specifying value is transmitted. The first image data 100C is selected according to the direction specifying value to continuously or intermittently change the selection of the adjacent camera units even when a continuous swiping operation is performed by the user on the display monitor 36. That is, when switching the image data, the selection unit 24 selects the first image data 100C. When the user's swiping operation is completed, the selection unit 24 transmits the second image data 100D corresponding to the last received direction specifying value. In this configuration, since the selection unit 24 has already selected and transmitted the first image data 100C, both the first image data 100C and the second image data 100D will be selected. In the same manner as described above, when the information processing terminal 30 receives both the first image data 100C and the second image data 100D, it first displays the image based on the first image data 100C on the display monitor 36, switches the image at a predetermined time point, and displays the image based on the second image data 100D on the display monitor 36.

Figure 12:
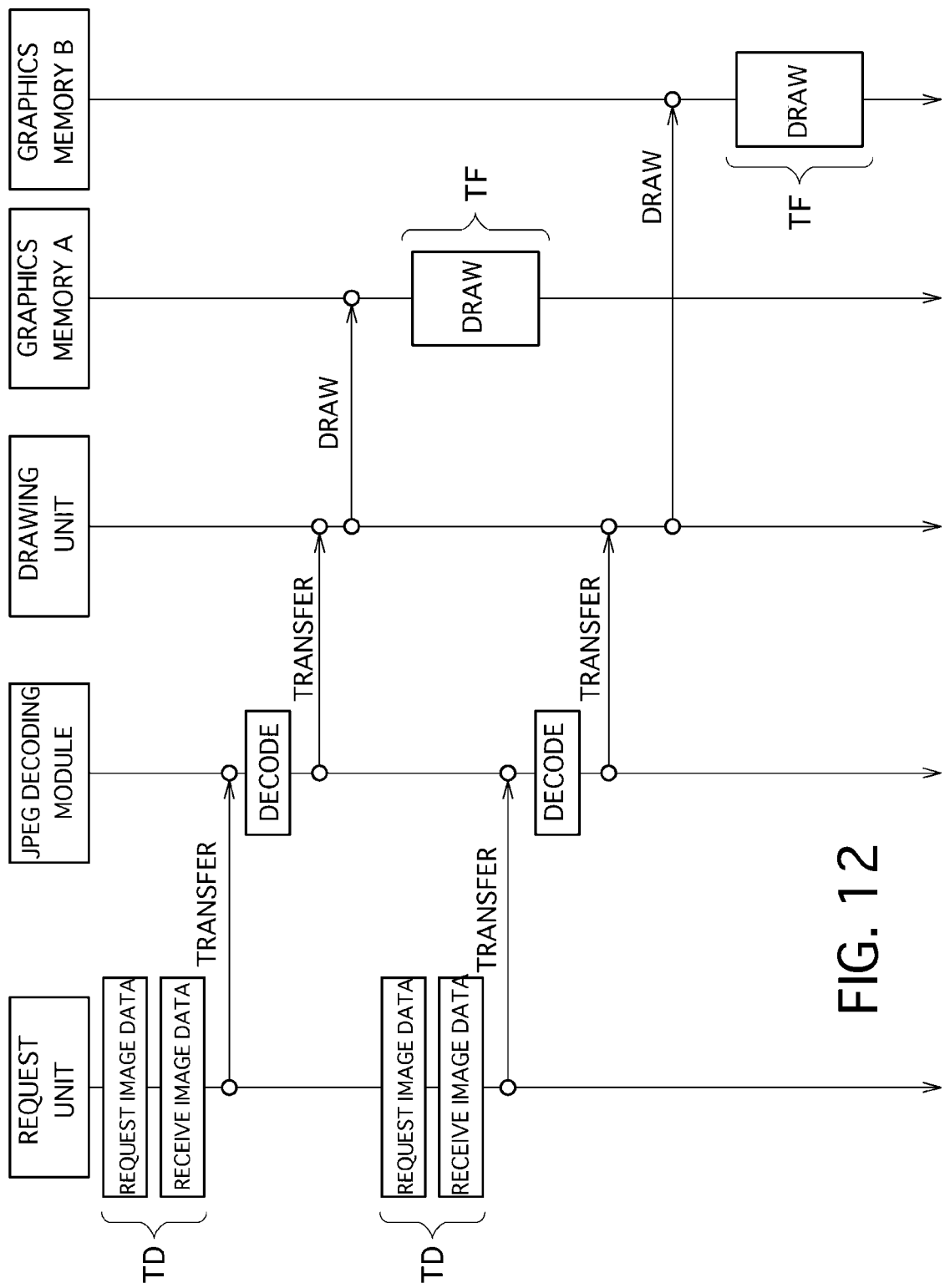
FIG. 12 is a sequence diagram illustrating processes in the information processing terminal.

In the information processing terminal 30, the time TF in which the drawing unit draws the image data on the display monitor 36 is shorter than the time TD in which the request unit acquires the image data from the selection unit 24 and transfers it to the drawing unit. This point will be described using FIG. 12. FIG. 12 is a sequence diagram illustrating processes in the information processing terminal.

As shown in FIG. 12, when the request unit receives the image data requested to the selection unit 24, it transfers the data to the JPEG decoding module 39. When decoding of the image data is completed by the JPEG decoding module 39, the decoded image data is transferred to the drawing LSI 35 as the drawing unit. The time from the request of image data by the request unit to the transfer to the drawing unit is defined as TD.

Next, the drawing unit draws the transferred image data in the graphics memory. In this configuration, the two graphics memories are alternatively used to draw the image data. When the drawing of the image data to the graphics memory is completed, the image data is in a state to be displayed on the display monitor 36. The time that the drawing unit draws in the graphics memory is defined as TF.

In this configuration, TD is shorter than TF, thereby achieving a state in which the drawing unit is always waiting for the transfer of image data to be drawn next when the drawing by the drawing unit is finished. This allows smooth playback of the image data.

Figure 13:
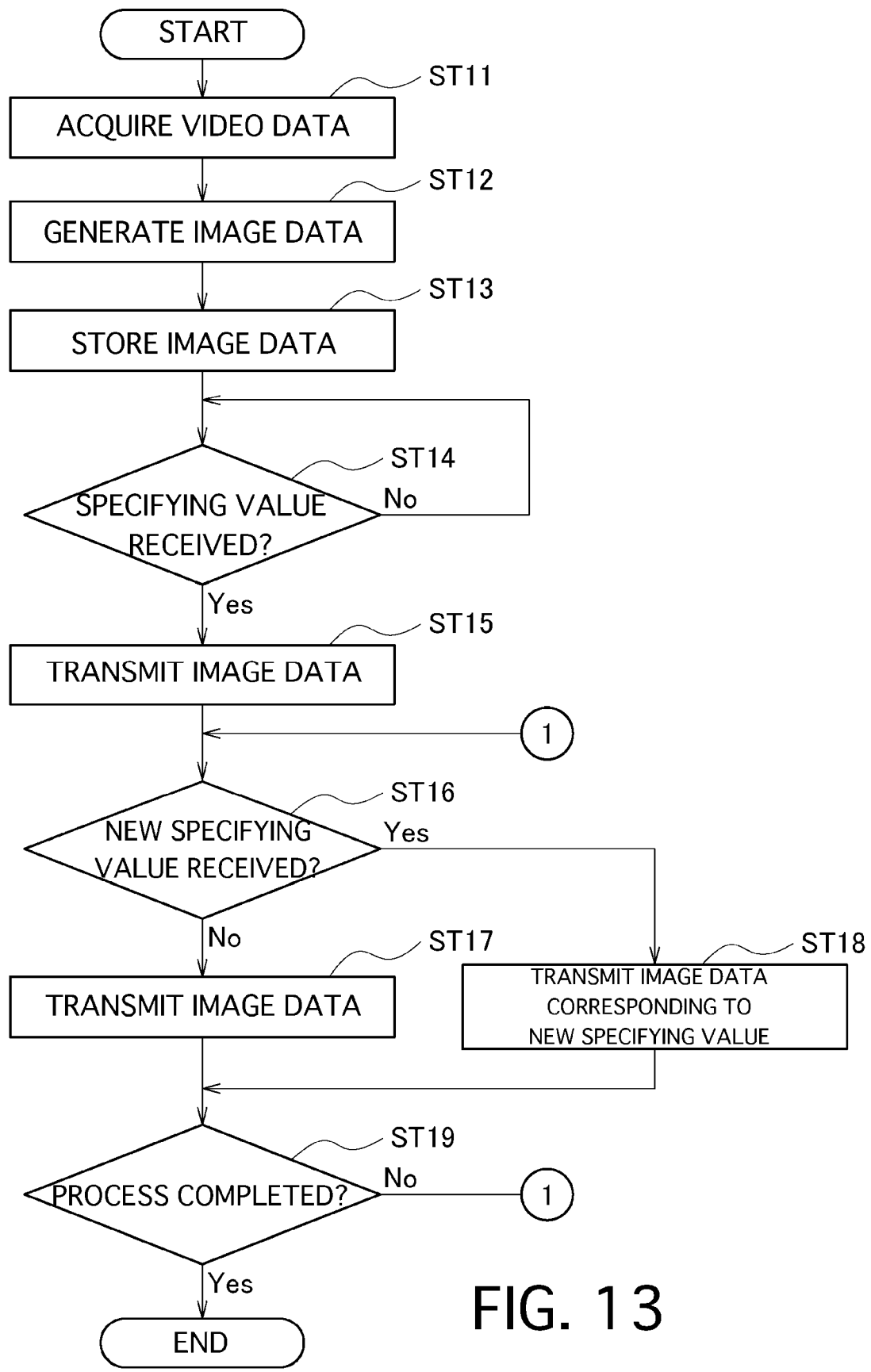
FIG. 13 is a flowchart for illustrating an image distribution method according to an example.

Next, an image distribution method according to an example will be described. FIG. 13 is a flowchart illustrating an image distribution method according to an example.

In step ST11, the acquisition unit 21 acquires a plurality of video data. The plurality of video data is generated at each of the plurality of mobile terminals 10.

In step ST12, the data generator 22 generates image data based on the video data acquired in step ST11. The data generator 22 generates image data by, for example, generating a plurality of still image groups by grouping together a plurality of frames in chronological order. Alternatively, the data generator 22 may generate the image data by, for example, generating a plurality of still image clusters by grouping a plurality of frames in chronological order, and further generating a plurality of still image groups by grouping the plurality of generated still image clusters in chronological order. Alternatively, the data generator 22 may, for example, generate a plurality of still image clusters by grouping a plurality of frames in chronological order, and at the same time, extract one or more frames from among the frames configuring the still image clusters, and generate a plurality of still image groups by grouping the still image clusters and the one or more frames to generate the image data.

In step ST13, the storage 25 stores the image data generated in step ST12. In this configuration, the storage 25 associates and stores the image data with a specifying value for specifying the image data. Specifically, the storage 25 associates and stores the image data with the position data indicating the imaging position at which the subject is imaged to generate each of the plurality of video data as the specifying value on one-to-one basis. In addition, the storage 25 associates and stores the frame configuring the image data with the time at which the frame is imaged.

In step ST14, the specifying value reception unit 23 determines whether or not a specifying value for specifying the image data that the user wishes to view is received. If the specifying value is not received (No), the process performs the determination in step ST14 again. If the specifying value is received (Yes), the process proceeds to step ST15.

In step ST15, the selection unit 24 selects one image data from the plurality of image data stored in step ST13 based on the specifying value received by the specifying value reception unit 23, and transmits the selected image data (still image group) to the information processing terminal 30.

In step ST16, the specifying value reception unit 23 determines whether or not a new specifying value is received. If new specifying value is not received (No), the process proceeds to step ST17. If new specifying value is received (Yes), the process proceeds to step ST18.

In step ST17, the selection unit 24 transmits to the information processing terminal 30 image data (still image group) chronologically successive to the image data (still image group) transmitted in step ST15.

In step ST18, the selection unit 24 selects one image data from the plurality of image data stored in step ST13 based on the new specifying value received by the specifying value reception unit 23, and transmits the selected image data (still image group) to the information processing terminal 30.

In step ST19, the CPU of the image distribution apparatus 20 determines whether or not an instruction to stop distribution of the image is received from the information processing terminal 30. If the instruction to stop the distribution of the image is not received (No), the process returns to step ST16. If the instruction to stop the distribution of the image is received (Yes), the process is completed.

This configuration achieves the following advantages. The image distribution apparatus 20 transmits the image data to the information processing terminal 30 on the basis of the specifying value. The image data includes a still image group configured by a plurality of frames. As described above, the image distribution apparatus 20 transmits a still image cluster (image data) to the information processing terminal 30 by receiving one specifying value, thereby reducing the processing load compared to when the frames are selected one by one and transmitted. In addition, the image distribution apparatus 20 is capable of generating divided video data (corresponding to an example of a "still image cluster" of the present disclosure) by dividing the video data into a plurality of frames in chronological order. This allows the image distribution apparatus 20, as an example, to compress the divided video data chosen between the divided video data configured by three frames and the data having three images (still images) configured by one frame to reduce the file size. This in turn allows the image distribution apparatus 20 to shorten the time required for data transmission compared to the conventional method. In addition, the information processing terminal 30 stores all the received divided video data in a storage (not shown) such as a hard disk of the information processing terminal 30, and thus even if the information processing terminal 30 displays an image based on the divided video data by accessing the divided video data stored in the storage without accessing the image distribution apparatus 20, it is possible to easily switch the divided video data to other divided video data. This allows the information processing terminal 30 to seamlessly switch the image data from image data based on a video imaged by one mobile terminal 10 (as an example, divided video data) to image data based on an image imaged by another mobile terminal 10 (as an example, divided video data). Conventionally, when playing a normal video on an information processing terminal, the greater the file size to some extent is and the greater the number of mobile terminals is, the more the data needs to be loaded into the storage of the information processing terminal in advance, which is difficult to be performed in practice. That is, when a conventional information processing terminal accesses a storage to load a video, it takes time to load the video, and even after the video is loaded, it is necessary to seek the video before the time of switching, which makes seamless switching difficult. In contrast, the information processing terminal 30 of the configuration, for example, is capable of seamlessly switching the video data to other divided video data even when the divided video data is stored in the storage. When switching the image data from one image data corresponding to one mobile terminal 10 to another image data corresponding to another mobile terminal 10, the image distribution apparatus 20 switches the frame from the chronologically last frame (one image data) configuring the still image group or the still image cluster to the chronologically first frame (other image data) configuring the still image group or still image cluster. This allows the image distribution apparatus 20 to transmit the chronologically successive data to the information processing terminal 30. As described above, the still image cluster may be divided video data generated by dividing the video data into a plurality of frames. In this configuration, the still image group may be configured by one or more divided video data.

In addition, when switching the image data from one image data to another image data, the image distribution apparatus 20 switches such that the frame is switched from one or more frames in a still image group configuring the one image data to one or more frames in a still image group configuring the other image data. Even in this configuration, the image distribution apparatus 20 is capable of transmitting the chronologically successive data to the information processing terminal 30. In addition, when switching the image data from one image data to another image data, the image distribution apparatus 20 switches at a point of one frame, thereby allowing the switching to be easier than in the case of image data configured by only a still image group.

The image distribution system 1 receives a direction specifying value for viewing the subject O from the information processing terminal 30, and acquires and reproduces image data corresponding to the direction each time the direction specifying value is received. This allows the direction of the subject O that the user 40 wishes to view to be smoothly displayed from various directional angles by a simple operation of the information processing terminal 30.

In addition, when selecting a still image based on the time data as reference, the selection unit 24 first selects the image data corresponding to the position data that is selected at that instant. This limits the sudden change of the direction in which the subject is viewed to allow the simulated video to be a natural successively connected video.

Also, only the image data for one imaging unit is transmitted in response to a swiping operation on the screen of the information processing terminal 30, thereby reducing the amount of data communication between the image distribution apparatus 20 and the information processing terminal 30. Accordingly, although the communication capacity in the communication network between the image distribution apparatus 20 and the information processing terminal 30 is limited, the capacity per image data can be increased compared to a configuration in which, for example, the image data of each of a plurality of imaging units is simultaneously transmitted, allowing the pseudo video played back on the information processing terminal 30 to have a high resolution.

In addition, the imaging unit is a portable terminal 10 having a video recording function and capable of transmitting the recorded video data to a communication network, thereby allowing the data to be easily exchanged between the imaging unit and the image distribution apparatus 20 via the communication network.

Also, the direction specifying operation can be performed by a simple operation of swiping the screen of the display monitor 36, thereby allowing the user 40 to specify the direction in which he or she wishes to view the subject O in the pseudo movie by an intuitive and simple operation.

In addition, since the selection unit 24 selects the image data intermittently when the user 40 performs a swiping operation, for example, the amount of data transmitted to the information processing terminal 30 can be reduced compared to when the selection unit 24 successively selects the image data. This ensures that the amount of data communicated between the image distribution apparatus 20 and the information processing terminal 30 is limited even when the amount of operation in the direction specifying operation of the user 40 is increased and the amount of direction data lined up in correspondence with the amount of operation is increased.

The examples have been described above with reference to the drawings, but the specific configuration is not limited to these examples. For example, although the above configuration shows an example in which the still image data includes one or more still image clusters, this disclosure is not limited to this example. For example, the still image cluster may be a video (divided video data) configured by a predetermined number of frames in which the video data is divided in chronological order. In this configuration, the information processing terminal 30 may preferably include a module for decoding, for example, image data including a video, which is transmitted from the information distribution apparatus. The image data transmitted from the image distribution apparatus 20 to the information processing terminal 30 is configured to include the divided video data, for example, thereby allowing the amount of data (amount of data for one image) in transmitting frame by frame and the amount of data of the divided video data configured by a plurality of frames (three frames as an example) to be the same. That is, the image data transmitted from the image distribution apparatus 20 to the information processing terminal 30 is configured to include the divided video data, thereby reducing the amount of data to be transmitted. Accordingly, since the divided video data is divided into a plurality of frames, even when the image data is switched from one image data to another, the switching may be performed to a degree comparable to that of image data configured by still images.

The data generator 22 of the image distribution apparatus 20 may generate two types of image data from one video data: image data configured by only still images and image data configured by divided video data. For example, even when video data is generated by imaging for five seconds, the video data for five seconds is divided into a plurality of frames in chronological order to generate the divided video data as well as the image data configured by the still images, thereby allowing the image data to be smoothly displayed on the information processing terminal 30 and easily switched to other image data. In the above configuration and in the configurations of FIGS. 3C and 3D, only the divided video data may be generated based on the video data first. Thereafter, the points at which the image data is switched from one image data to another image data may be stored in a log, for example, and the image data of the still image may be generated by extracting (copying) the still image from the divided video data at the points where the switching is relatively frequent. In addition, when the image data is switched from one image data to another image data, the image data of the still image may be generated by extracting (copying) the still image from the divided video data at the points where the operation of switching is slow. This switches the image data from one image data to the other faster. Accordingly, since the image distribution apparatus 20 generates the image data of the still image only for the necessary portions compared to when the image data of the still image is created from the beginning based on the video data, the amount of data can be reduced and the video data in the Swipe Video format can be generated at a high speed. In addition, the image distribution apparatus 20 may store in a log, for example, the points where the image data is switched from one image data to another image data, and delete the still images at points where the switching is relatively less (less than a preset threshold value). In addition, in the above configuration, an example of a still image that is generated or deleted is described, but what is generated or deleted may be divided video data of any number of seconds such as 100 milliseconds as an example.

As the imaging unit, a configuration as a camera included in the mobile terminal 10 is shown. However, the imaging unit is not limited to this. That is, the imaging unit may be a digital camera, for example.

In the above example, a configuration in which the information processing terminal 30 generates HTML data using the image data transmitted from the image distribution apparatus 20 is shown. However, the example is not limited to this configuration. In the image distribution apparatus 20, the image data may be converted into HTML data and then transmitted to the information processing terminal 30.

In the above example, a configuration in which the image is imaged in Bullet Time by a plurality of imaging units is shown. However, the example is not limited to this configuration. For example, a video such as a scenery imaged at multiple points may be used. In addition, in the Bullet Time imaging in the above example, a configuration in which a plurality of mobile terminals 10 are circumferentially arranged in a plane at the same height with respect to the subject O is shown, but the example is not limited to this configuration. A plane may be set at a plurality of heights, and at each height plane, a camera group may be configured, and the selection unit 24 may select image data to span these camera groups. This allows the user to select a three-dimensional viewing direction for the subject O. For example, one or more mobile terminals 10 (Top) for imaging a subject from the upper portion, one or more mobile terminals 10 (Center) for imaging a subject from the middle portion, one or more mobile terminals 10 (Bottom) for imaging a subject from the lower portion, and one or more mobile terminals 10 (Zoom) for imaging an enlarged image of a subject are prepared, and the plurality of mobile terminals 10 generate the video data. The image distribution apparatus 20 generates image data based on the video data in the same manner as described above. The user performs a swiping operation on the screen, for example, allowing the information processing terminal 30 to switch the image data based on the video data imaged by a plurality of mobile terminals 10 to display the video imaged by the specified mobile terminal 10.

The subject to be imaged by the imaging unit need not be a person playing a sport as shown in FIG. 1, but may be, for example, a person performing an operation, an animal other than a person, an entire stadium, or a performance of a celebrity or a singer, for example. The image distribution system 1 may also be used for landscapes, but basically it is effective for moving objects such as humans and animals. This is because this image distribution system 1 is capable of providing pseudo video such as 360-degree video, which is effective for dynamic subjects O.

In addition to the swiping operation, the information processing terminal 30 can also specify other directions by the trajectory of a finger. That is, the user 40 can input an operation command by moving his or her finger in front of the screen without contacting the display monitor 36 of the information processing terminal 30. In this configuration, for example, as the operation recognition unit 38, a firmware that images an image of the front of the display monitor 36 and coordinates the movement of a finger may be separately installed in the information processing terminal 30 to embody this.

In the above example, a configuration is shown in which when the specifying value reception unit 23 receives a direction specifying value, the selection unit 24 selects the image data so that the direction data is intermittently connected when the amount of change of the direction specifying value per unit time is greater than or equal to a threshold value. However, the example is not limited to this configuration.

That is, the process of selecting the image data intermittently in this manner may be performed on the information processing terminal 30 side without being performed on the image distribution apparatus 20 side.

In this configuration, for example, the information processing terminal 30 may be configured so that the request unit intermittently requests the image data to be displayed on the display monitor 36 to the selection unit 24 when the operation amount in the direction specifying operation recognized by the operation recognition unit 38 is greater than or equal to a threshold value.

In addition, each functional unit of the image distribution system 1 may be a logic circuit (hardware) formed in an integrated circuit (integrated circuit (IC) chip, large scale integration (LS)), for example, or by a dedicated circuit, or by software using a central processing unit (CPU) and a memory. Each functional unit may be one or more integrated circuits, and the functions of the plurality of functional units may be a single integrated circuit. LSIs are sometimes referred to as VLSIs, Super LSIs, or Ultra LSIs, depending on the level of integration.

In the above described examples, although an example in which the data acquisition program, the data generation program, and the request program are stored in ROM is illustrated, this disclosure is not limited to this example. For example, each of the above described programs may be stored in a recording medium such as a hard disk, and the programs may be read into RAM and executed.

The invention claimed is:

1. An image distribution system comprising:
an image distribution apparatus, comprising
a storage that associates and stores, for each of a plurality of video data, image data generated by grouping frames configuring the video data in chronological order with a specifying value that specifies the image data; and
a processor configured to:
receive a specifying value that specifies image data that a user wishes to view;
select one image data from a plurality of image data stored in the storage, and transmits the selected image data to an external display device,
acquire a plurality of video data; and
generate image data based on the video data and stores the image data in the storage;
wherein
the processor is configured to:
if the specifying value is not received by the processor, select the image data corresponding to a specifying value that has already been specified, and transmit the selected image data to the display device,
if the specifying value is received by the processor, select the image data corresponding to the received specifying value, and at the same time, identify a frame configuring a new image data corresponding to the same time as or a time immediately after a time data of one image data corresponding to a time when the specifying value is received by the processor as reference, and transmit the new image data after the identified frame to the display device, and
the processor generates a plurality of still image clusters by grouping a plurality of frames in chronological order, and at the same time, extracts one or more frames from among the frames configuring the still image clusters, and generates a plurality of still image groups by grouping the still image clusters and the one or more frames to generate image data; wherein
the storage associates and stores the frame configuring the image data with a time at which the frame is imaged, and when the processor transmits one image data, when a new specifying value is received by the processor, the processor identifies a frame of the new image data corresponding to the same time as or a time immediately after a time when a frame configuring the one image data corresponding to a time when the new specifying value is received as reference is imaged; wherein
the storage associates and stores an image data with a position data indicating an imaging position at which a subject is imaged to generate each of the plurality of video data as the specifying value on one-to-one basis; wherein
the processor acquires a plurality of video data in which a subject is imaged from different directions, the position data corresponds to direction data that indicates information allowing a direction in which the subject is imaged to be identified, and the processor receives, as the specifying value, a direction specifying value for specifying a direction data corresponding to an image data that the user wishes to view; and
a plurality of mobile terminals arranged to surround the subject and connected to the image distribution apparatus via a communication network, wherein the plurality of mobile terminals configure a plurality of imaging units that respectively generate video data by imaging the subject from different directions, and transmit the video data to the image distribution apparatus via the communication network, and the processor acquires a plurality of video data transmitted by each of the plurality of mobile terminals;
further comprising an information processing terminal comprising the display device, the information processing terminal comprising:
a touch panel that receives and displays the image data transmitted from the image distribution apparatus; wherein
the information processing terminal recognizes a movement of a finger of the user as an operation to the touch panel as a direction specifying operation to select a direction specifying value, and recognizes an amount of the movement of the finger of the user as a direction specifying value, wherein
the information processing terminal displays on the touch panel an image data that is transmitted from the processor and corresponds to the direction specifying value that changes based on the direction specifying operation when the direction specifying operation is performed, and at the same time, and
if the direction specifying operation is not performed, the information processing terminal sequentially receives the image data of the direction specifying value based on the immediately preceding direction specifying operation in chronological order of time data, and displays a pseudo movie on the touch panel; wherein
the information processing terminal recognizes a swiping operation on the touch panel as the direction specifying operation; wherein
when the processor receives the direction specifying value, the processor is configured to:
if an amount of change in the direction specifying value per unit time is less than a predetermined threshold value, select an image data such that the direction data is continuously connected, and
if the amount of change in the direction specifying value per unit time is greater than or equal to the predetermined threshold value, select an image data such that the direction data is intermittently connected.

2. The image distribution apparatus according to claim 1, wherein
when the processor transmits the selected image data to the display device, the processor transmits, as the selected image data, a first image data and a second image data generated from one video data, the first image data is directed to image data obtained by generating a plurality of still image groups by grouping a plurality of frames together in chronological order by the processor, and the second image data is directed to image data obtained by generating a plurality of still image clusters by grouping together a plurality of frames in chronological order, and further generating a plurality of still image groups by grouping together the plurality of generated still image clusters in chronological order by the processor.

3. The image distribution system according to claim 1, wherein the information processing terminal is further configured to:

request image data to be displayed on the touch panel based on the direction specifying value to the processor; and use hyper text markup language (HTML) data to draw the image data acquired by the information processing terminal on the touch panel, wherein a time TF during which the information processing terminal draws the image data on the touch panel is longer than a time TD during which the information processing terminal acquires the image data from the processor and transfers it to the information processing terminal.

4. An image distribution method causing a computer to execute the steps of:

associating and storing in a storage, for each of a plurality of video data, image data generated by grouping frames configuring the video data in chronological order with a specifying value for specifying the image data;

receiving a specifying value that specifies image data that a user wishes to view, if a specifying value is sent;

selecting one image data from a plurality of image data stored in the storage, and transmitting the selected image data to an external display device, acquiring a plurality of video data; and generating image data based on the video data and stores the image data in the storage; wherein the selecting step includes the steps of:

if the specifying value is not received in the specifying value receiving step, selecting an image data corresponding to a specifying value that has already been specified, if the specifying value is received in the specifying value receiving step, selecting the image data corresponding to the received specifying value, and at the same time, identifying a frame configuring a new image data corresponding to the same time as or a time immediately after a time data of one image data corresponding to a time when the specifying value is received in the specifying value receiving step as reference, and transmitting the new image data after the identified frame to the display device; and the generating step generates a plurality of still image clusters by grouping a plurality of frames in chronological order, and at the same time, extracts one or more frames from among the frames configuring the still image clusters, and generates a plurality of still image groups by grouping the still image clusters and the one or more frames to generate image data;

associating and storing in a storage the frame configuring the image data with a time at which the frame is imaged, and when a processor transmits one image data, when a new specifying value is received by the processor, identifying via the processor a frame of the new image data corresponding to the same time as or a time immediately after a time when a frame configuring the one image data corresponding to a time when the new specifying value is received as reference is imaged;

associating and storing in the storage an image data with a position data indicating an imaging position at which a subject is imaged to generate each of the plurality of video data as the specifying value on one-to-one basis;

acquiring via the processor a plurality of video data in which a subject is imaged from different directions, the position data corresponds to direction data that indicates information allowing a direction in which the subject is imaged to be identified, and receiving via the processor, as the specifying value, a direction specifying value for specifying a direction data corresponding to an image data that the user wishes to view; and configuring, via a plurality of mobile terminals arranged to surround the subject and connected to an image distribution apparatus via a communication network, a plurality of imaging units that respectively generate video data by imaging the subject from different directions, and transmit the video data to the image distribution apparatus via the communication network, and the processor acquires a plurality of video data transmitted by each of the plurality of mobile terminals;

further comprising an information processing terminal comprising the display device, the information processing terminal comprising:

receiving and displaying, via a touch panel, the image data transmitted from the image distribution apparatus;

recognizing, via the information processing terminal, a movement of a finger of the user as an operation to the touch panel as a direction specifying operation to select a direction specifying value, and recognizes an amount of the movement of the finger of the user as a direction specifying value, displaying on the touch panel an image data that is transmitted from the processor and corresponds to the direction specifying value that changes based on the direction specifying operation when the direction specifying operation is performed, and at the same time, and if the direction specifying operation is not performed, the information processing terminal sequentially receives the image data of the direction specifying value based on the immediately preceding direction specifying operation in chronological order of time data, and displays a pseudo movie on the touch panel;

wherein the information processing terminal recognizes a swiping operation on the touch panel as the direction specifying operation;

wherein when the processor receives the direction specifying value, the processor is configured to: if an amount of change in the direction specifying value per unit time is less than a predetermined threshold value, select an image data such that the direction data is continuously connected, and if the amount of change in the direction specifying value per unit time is greater than or equal to the predetermined threshold value, select an image data such that the direction data is intermittently connected.

5. A non-transitory computer readable medium storing an image distribution program causing a computer to embody the functions of:

associating and storing in a storage, for each of a plurality of video data, image data generated by grouping frames configuring the video data in chronological order with a specifying value for specifying the image data;

receiving a specifying value that specifies image data that a user wishes to view, if a specifying value is sent;

selecting one image data from a plurality of image data stored in the storage, and transmitting the selected image data to an external display device, acquiring a plurality of video data; and generating image data based on the video data and stores the image data in the storage; wherein the selecting function is configured to:

if the specifying value is not received by the specifying value receiving function, selecting an image data corresponding to a specifying value that has already been specified, if the specifying value is received by the specifying value receiving function, selecting the image data corresponding to the received specifying value, and at the same time, identifying a frame configuring a new image data corresponding to the same time as or a time immediately after a time data of one image data corresponding to a time when the specifying value is received by the specifying value receiving function as reference, and transmitting the new image data after the identified frame to the display device; and the generating function generates a plurality of still image clusters by grouping a plurality of frames in chronological order, and at the same time, extracts one or more frames from among the frames configuring the still image clusters, and generates a plurality of still image groups by grouping the still image clusters and the one or more frames to generate image data;

associating and storing in a storage the frame configuring the image data with a time at which the frame is imaged, and when a processor transmits one image data, when a new specifying value is received by the processor, identifying via the processor a frame of the new image data corresponding to the same time as or a time immediately after a time when a frame configuring the one image data corresponding to a time when the new specifying value is received as reference is imaged;

associating and storing in the storage an image data with a position data indicating an imaging position at which a subject is imaged to generate each of the plurality of video data as the specifying value on one-to-one basis;

acquiring via the processor a plurality of video data in which a subject is imaged from different directions, the position data corresponds to direction data that indicates information allowing a direction in which the subject is imaged to be identified, and receiving via the processor, as the specifying value, a direction specifying value for specifying a direction data corresponding to an image data that the user wishes to view; and configuring, via a plurality of mobile terminals arranged to surround the subject and connected to an image distribution apparatus via a communication network, a plurality of imaging units that respectively generate video data by imaging the subject from different directions, and transmit the video data to the image distribution apparatus via the communication network, and the processor acquires a plurality of video data transmitted by each of the plurality of mobile terminals;

further comprising an information processing terminal comprising the display device, the information processing terminal comprising:

receiving and displaying, via a touch panel, the image data transmitted from the image distribution apparatus;

recognizing, via the information processing terminal, a movement of a finger of the user as an operation to the touch panel as a direction specifying operation to select a direction specifying value, and recognizes an amount of the movement of the finger of the user as a direction specifying value, displaying on the touch panel an image data that is transmitted from the processor and corresponds to the direction specifying value that changes based on the direction specifying operation when the direction specifying operation is performed, and at the same time, and if the direction specifying operation is not performed, the information processing terminal sequentially receives the image data of the direction specifying value based on the immediately preceding direction specifying operation in chronological order of time data, and displays a pseudo movie on the touch panel; wherein the information processing terminal recognizes a swiping operation on the touch panel as the direction specifying operation; wherein when the processor receives the direction specifying value, the processor is configured to: if an amount of change in the direction specifying value per unit time is less than a predetermined threshold value, select an image data such that the direction data is continuously connected, and if the amount of change in the direction specifying value per unit time is greater than or equal to the predetermined threshold value, select an image data such that the direction data is intermittently connected.

\* \* \* \* \*